US011792635B2

(12) United States Patent
Mildh et al.

(10) Patent No.: US 11,792,635 B2
(45) Date of Patent: *Oct. 17, 2023

(54) METHODS FOR HANDLING RADIO ACCESS NETWORK NOTIFICATION AREA (RNA) UPDATE CONFIGURATION UPON REJECT

(71) Applicant: Telefonaktiebolaget LM Ericsson (publ), Stockholm (SE)

(72) Inventors: Gunnar Mildh, Sollentuna (SE); Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 153 days.

This patent is subject to a terminal disclaimer.

(21) Appl. No.: 17/232,329

(22) Filed: Apr. 16, 2021

(65) Prior Publication Data
US 2021/0235256 A1 Jul. 29, 2021

Related U.S. Application Data

(63) Continuation of application No. 16/466,546, filed as application No. PCT/SE2019/050400 on May 7, 2019, now Pat. No. 11,012,848.
(Continued)

(51) Int. Cl.
*H04W 8/08* (2009.01)
*H04W 76/27* (2018.01)
*H04W 84/04* (2009.01)

(52) U.S. Cl.
CPC ............ *H04W 8/08* (2013.01); *H04W 76/27* (2018.02); *H04W 84/042* (2013.01)

(58) Field of Classification Search
CPC ..... H04W 8/08; H04W 76/27; H04W 84/042; H04W 8/00; H04W 8/02; H04W 8/04;
(Continued)

(56) References Cited

U.S. PATENT DOCUMENTS 8,644,824 B1 * 2/2014 Sigg et al. ............... 455/435.1
11,012,848 B2 * 5/2021 Mildh et al. ............ H04W 8/08
(Continued)

FOREIGN PATENT DOCUMENTS

CN 104737615 A 6/2015
JP 2019537356 A 12/2019
(Continued)

OTHER PUBLICATIONS

Communication Method and Apparatus; WO 2019242756 A1; published to Jin et al. (Year: 2019).*
(Continued)

*Primary Examiner* — Meless N Zewdu
(74) *Attorney, Agent, or Firm* — Murphy, Bilak & Homiller, PLLC

(57) ABSTRACT

A wireless device handles area update reports. The wireless device initiates a radio network area update, RNAU, responsive to detecting that the wireless device has entered a cell not belonging to a radio network area, RNA, configured for the wireless device. The wireless device receives, from the wireless network, a message indicating that the wireless device's attempt to perform the RNAU has been rejected. The message includes or is accompanied by an indication that a wait time value is applicable. Responsive to the message, the wireless device sets a reject wait timer to the wait time value and performs the RNAU upon expiry of the reject wait timer. In some embodiments, the wireless device sets a periodic RNAU timer to the wait time value, responsive to the message, and performs the RNAU upon expiry of the reject wait timer and the periodic RNAU timer.

26 Claims, 21 Drawing Sheets

Related U.S. Application Data

(60) Provisional application No. 62/667,969, filed on May 7, 2018.

(58) Field of Classification Search
CPC .......... H04W 8/06; H04W 8/10; H04W 8/12; H04W 8/14; H04W 8/16; H04W 8/18; H04W 60/00; H04W 60/005; H04W 60/02; H04W 60/04; H04W 60/06; H04W 64/00; H04W 64/003; H04W 64/006; H04W 4/029; H04W 4/021; H04W 4/02; H04W 4/00; H04W 4/38; H04W 4/40; H04W 8/183; H04W 8/186; H04W 8/20; H04W 48/00; H04W 48/02; H04W 48/14; H04W 48/20; H04W 68/00; H04W 68/04; H04W 68/06; H04W 68/08; H04W 76/00; H04W 68/12; H04W 76/15; H04W 76/11; H04W 76/18; H04W 76/19; H04W 76/20; H04W 76/25; H04W 76/28; H04W 76/30; H04W 76/38; H04W 88/00; H04W 88/02; H04W 88/08; H04W 76/188; H04W 84/02; H04W 28/0289; H04W 48/06; H04W 92/00; H04W 92/02; H04W 36/0061; H04W 36/0066; H04W 36/0072; H04W 36/0077; H04W 36/0079; H04W 36/0083; H04W 36/00835; H04W 76/10
See application file for complete search history.

(56) References Cited

U.S. PATENT DOCUMENTS

| | | | |
|---|---|---|---|
| 2011/0081887 A1 | 4/2011 | Chakraborty et al. | |
| 2012/0252451 A1 | 10/2012 | Knauft et al. | |
| 2013/0260811 A1 | 10/2013 | Rayavarapu et al. | |
| 2014/0095631 A1 | 4/2014 | Ravi et al. | |
| 2014/0153408 A1* | 6/2014 | Jun et al. | 370/250 |
| 2014/0221001 A1 | 8/2014 | Yang et al. | |
| 2014/0295838 A1* | 10/2014 | Won et al. | H04W 60/32 |
| 2014/0355417 A1 | 12/2014 | Kim et al. | |
| 2015/0119032 A1 | 4/2015 | Koskela et al. | |
| 2015/0156813 A1 | 6/2015 | Koskela et al. | |
| 2015/0195809 A1 | 7/2015 | Sun et al. | |
| 2016/0014681 A1 | 1/2016 | Yi | |
| 2017/0094577 A1 | 3/2017 | Kim et al. | |
| 2017/0374610 A1 | 12/2017 | Kim et al. | |
| 2018/0007729 A1* | 1/2018 | Koshta et al. | H04W 76/027 |
| 2018/0049030 A1 | 2/2018 | Manepalli et al. | |
| 2019/0098546 A1* | 3/2019 | Cha et al. | H04W 36/12 |
| 2019/0253952 A1 | 8/2019 | Kumar et al. | |
| 2019/0306853 A1 | 10/2019 | Ishii | |
| 2020/0120476 A1 | 4/2020 | Lee et al. | |
| 2020/0221524 A1* | 7/2020 | Jiang | H04W 76/18 |
| 2021/0084528 A1* | 3/2021 | Kim et al. | H04W 28/0289 |

FOREIGN PATENT DOCUMENTS

| | | |
|---|---|---|
| WO | 2017140341 A1 | 8/2017 |
| WO | 2019216811 A1 | 11/2019 |
| WO | 2022148338 A1 | 7/2022 |

OTHER PUBLICATIONS

Methods and Apparatuses for Handling Radio Access Network Notification Area (RNA) Update Configuration Upon Reject; WO 2019216809 A1; published to Mildh et al. (Year: 2019).*

UE Behavior With Rejection of Resume Request; WO 2019215553 A1; published to Mildh et al. (Year: 2019).*

Method and Device for Cellular Connection Management; CN 104396336 A; publishd to Koskela et al. (Year: 2015).*

3GPP, "3rd Generation Partnership Project; Technical Specification Group Radio Access Network NR Radio Resource Control (RRC) protocol specification (Release 15)", 3GPP TS 38.331 V15.0.0, Dec. 2017, 1-188.

3GPP, "3rd Generation Partnership Project; Technical Specification Group Radio Access Network; NR; Radio Resource Control (RRC) protocol specification (Release 15)", 3GPP TS 38.331 V15.1.0, Mar. 2018, 1-268.

3GPP, "3rd Generation Partnership Project; Technical Specification Group Radio Access Network; Study on New Radio Access Technology; Radio Access Architecture and Interfaces (Release 14)", 3GPP TR 38.801 V1.2.0, Feb. 2017, 1-90.

3GPP, "CN area updating and combined TAU/RNAin RRC_INACTIVE", 3GPP TSG-RAN WG2 #101-Bis, Tdoc R2-1805357, Sanya, P.R. of China,, Apr. 16-20, 2018, 1-6.

3GPP, "Remaining issues on RAN-based notification area update procedure", 3GPP TSG-RAN WG2 Meeting #101 bis, R2-1804946, Sanya, China, Apr. 16-20, 2018, 1-4.

3GPP, "Stage 3 RRC TP on RRC_INACTIVE state for E-UTRA connected to 5GC", 3GPP TSG-RAN2 Meeting #101 bis, R2-180xxxx, Sanya, China, Apr. 16-20, 2018, 1-62.

Unknown, Author , "Stage 3 RRC TP on RRC_INACTIVE state for E-UTRA connected to 5GC", 3GPP TSG-RAN2 Meeting #101 bis R2-180xxxx (R2-1806233) Sanya, China, Apr. 16-20, 2018, 1-63.

Unknown, Author , "Stage 3 RRC TP on RRC_INACTIVE state for E-UTRA connected to 5GC", Intel, 3GPP TSG-RAN2 Meeting #101bis R2-1805051, Sanya, China, Apr. 16-20, 2018, pp. 1-59.

* cited by examiner

METHODS FOR HANDLING RADIO ACCESS NETWORK NOTIFICATION AREA (RNA) UPDATE CONFIGURATION UPON REJECT

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the access network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Procotol (IP) data packets between the UE and the EPC, and serves as the local mobility anchor for the data bearers when the UE moves between eNBs, such as eNBs 105, 110, and 115.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

FIG. 4 illustrates a high-level view of the 5G network architecture, consisting of a Next Generation RAN (NG-RAN) and a 5G Core (5GC). The NG-RAN can comprise a set of gNodeB's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof.

The NG RAN logical nodes shown in FIG. 4 (and described in 3GPP TR 38.801 v1.2.0) include a Central Unit (CU or gNB-CU) and one or more Distributed Units (DU or gNB-DU). CU is a logical node that is a centralized unit that hosts high layer protocols and includes a number of gNB functions, including controlling the operation of DUs. A DU is a decentralized logical node that hosts lower layer protocols and can include, depending on the functional split option, various subsets of the gNB functions. (As used herein, the terms "central unit" and "centralized unit" are used interchangeably, and the terms "distributed unit" and "decentralized unit" are used interchangeability.)

The NG, Xn-C and F1 items shown in FIG. 4 are logical interfaces. For NG-RAN, the NG and Xn-C interfaces for a split gNB (e.g., consisting of a gNB-CU and gNB-DUs) terminate in the gNB-CU. Likewise, for EN-DC, the S1-U and X2-C interfaces for a split gNB terminate in the gNB-CU. The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU.

Furthermore, a CU can host protocols such as RRC and PDCP, while a DU can host protocols such as RLC, MAC and PHY. Other variants of protocol distributions between CU and DU exist, such as hosting the RRC, PDCP and part of the RLC protocol in CU (e.g., Automatic Retransmission Request (ARQ) function), while hosting the remaining parts of the RLC protocol in the DU, together with MAC and PHY. In some exemplary embodiments, CU is assumed to host RRC and PDCP, where PDCP is assumed to handle both UP traffic and CP traffic. Nevertheless, other exemplary embodiments may utilize other protocol splits that by hosting certain protocols in CU and certain others in the DU. Exemplary embodiments can also locate centralized control plane protocols (e.g., PDCP-C and RRC) in a different CU with respect to the centralized user plane protocols (e.g., PDCP-U).

In LTE Rel-13 a mechanism was introduced for the UE to be suspended by the network in a suspended state similar to RRC_IDLE but with the difference that the UE stores the Access Stratum (AS) context or RRC context. This makes it possible to reduce the signaling when the UE becomes active again by resuming the RRC connection, thus eliminating the need to establish the RRC connection from scratch. Reducing the signaling can have several benefits, including reduced UE latency (e.g., for smart phones accessing the Internet) and reduced UE signaling, which further leads to reduced UE energy consumption, particularly for machine type communication (MTC) devices that send very little data (i.e., signaling being a primary consumer of energy).

The LTE Rel-13 solution is based on the UE sending a RRCConnectionResume-Request message to the network and in response receiving an RRCConnectionResume message form the network. The RRCConnectionResume is not encrypted, but is integrity protected.

As part of the 3GPP standardized work on 5G, it has been decided that NR should support an RRC_INACTIVE state with similar properties as the suspended state in LTE Rel-13. The RRC_INACTIVE state has slightly different properties in that it is a separate RRC state and not part of RRC_IDLE as in LTE. Additionally, the CN/RAN connection (NG or N2 interface) is kept alive during RRC_INACTIVE while it was suspended in LTE.

FIG. 5A is an exemplary state transition diagram showing possible transitions between RRC states in NR. The properties of the states shown in FIG. 5A are summarized as follows:

RRC_IDLE:
A UE specific DRX may be configured by upper layers;
UE controlled mobility based on network configuration;
The UE:
Monitors a Paging channel for CN paging using 5G-S-TMSI;
Performs neighbour cell measurements and cell (re-) selection;
Acquires system information.
RRC_INACTIVE:
A UE specific DRX may be configured by upper layers or by RRC layer;
UE controlled mobility based on network configuration;
The UE stores the AS context;
The UE:
Monitors a Paging channel for CN paging using 5G-S-TMSI and RAN paging using I-RNTI;
Performs neighboring cell measurements and cell (re-) selection;
Performs RAN-based notification area updates periodically and when moving outside the RAN-based notification area;
Acquires system information.
RRC_CONNECTED:
The UE stores the AS context.
Transfer of unicast data to/from UE.
At lower layers, the UE may be configured with a UE specific DRX;
For UEs supporting CA, use of one or more SCells, aggregated with the SpCell, for increased bandwidth;
For UEs supporting DC, use of one SCG, aggregated with the MCG, for increased bandwidth;
Network controlled mobility, i.e. handover within NR and to/from E-UTRAN.
The UE:
Monitors a Paging channel;
Monitors control channels associated with the shared data channel to determine if data is scheduled for it;
Provides channel quality and feedback information;
Performs neighbouring cell measurements and measurement reporting;
Acquires system information.

FIG. 5B shows an exemplary flow diagram, between a user equipment (UE) and NR gNB, of various operations during a procedure for transition from RRC_CONNECTED to RRC_INACTIVE. It has been agreed in 3GPP NR standardization that the transition from RRC_CONNECTED to RRC_INACTIVE is done in one step, and, may contain a timer for periodic RAN Notification Area (RNA) updates. It is assumed that the UE shall start the timer (called T380) upon receiving the RRCSuspend (or equivalent) message shown in FIG. 5B. Is also assumed that the UE shall trigger a periodic RNA update upon the expiry of T380. This is currently specified as follows in sections 5.3.14.3-4 of 3GPP TS 38.331:

---

5.3.14.3 Reception of the RRCSuspend by the UE
The UE shall:
    1> delay the following actions defined in this sub-clause X ms from the moment the
       RRCSuspend message was received or optionally when lower layers indicate that
       the receipt of the RRCSuspend message has been successfully acknowledged,
       whichever is earlier;
    Editor's Note: How to set the value of X (whether it is configurable, or fixed to 60ms
       as in LTE, etc.).
    1> if the RRCSuspend message includes the idleModeMobilityControlInfo:
       2> store the cell reselection priority information provided by the
          idleModeMobilityControlInfo;
       2> if the t320 is included:
          3> start timer T320, with the timer value set according to the value of
             t320;
    1> else:
       2> apply the cell reselection priority information broadcast in the system
          information;
    1> store the following information provided by the network: resumeIdentity,
       nextHopChainingCount, ran-PagingCycle and ran-NotificationAreaInfo;
    1> re-establish RLC entities for all SRBs and DRBs;
    1> reset MAC;
    1> except if the RRCSuspend message was received in response to an
       RRCResumeRequest:

2> store the UE AS Context including the current RRC configuration, the
current security context, the PDCP state including ROHC state, C-RNTI
used in the source PCell, the cellIdentity and the physical cell identity of the
source PCell;
1> suspend all SRB(s) and DRB(s), except SRB0;
1> start timer T380, with the timer value set to periodic-RNAU-timer;
1> indicate the suspension of the RRC connection to upper layers;
1> configure lower layers to suspend integrity protection and ciphering;
1> enter RRC_INACTIVE and perform procedures as specified in TS 38.304
5.3.14.4 T380 expiry or UE entering a cell not belonging to the RNA
The UE shall:
1> if T380 expires:
2> initiate RRC connection resume procedure in 5.3.13 with cause value set to
'ffs';
1> If UE entering a cell not belonging to the RNA:
2> initiate RRC connection resume procedure in 5.3.13 with cause value set to
'ffs';

As it has been agreed that RNA updates (RNAUs) are performed using the RRC resume procedure, the procedures discussed below are performed upon a UE entering a new RNA. More particularly, FIGS. 6A-6E show exemplary flow diagrams of RRC connection resume procedures involving the UE sending a RRCResumeRequest message to the network, with various network responses. FIG. 6A shows a successful RRC connection resume. FIG. 6B shows an RRCResumeRequest with fallback to RRC connection establishment, which is successful. FIG. 6C shows an RRCResumeRequest followed by network release, which is successful. FIG. 6D shows an RRCResumeRequest followed by network suspend, which is successful. FIG. 6E shows an RRCResumeRequest followed by network rejection. Each of the network responses shown in FIGS. 6B-6E can be considered different ways of rejecting the RRCResumeRequest, using different messages.

The UE initiates the RRC connection resume procedure upon request of upper layers, when responding to NG-RAN paging, or upon triggering RNA updates while the UE is in RRC_INACTIVE state. This is currently specified in 3GPP TS 38.331 section 5.3.13.2, as follows:
5.3.13.2 Initiation
The UE initiates the procedure when upper layers request resume of an RRC connection, when responding to NG-RAN paging or upon triggering RNA updates while the UE is in RRC_INACTIVE.
Upon initiation of the procedure, the UE shall:
1> apply the default physical channel configuration as specified in 9.2.4;
1> apply the default semi-persistent scheduling configuration as specified in 9.2.3;
1> apply the default MAC main configuration as specified in 9.2.2;
1> apply the CCCH configuration as specified in 9.1.1.2;
1> start timer T300X;
1> stop timer T380;
1> initiate transmission of the RRCResumeRequest message in accordance with 5.3.13.2 . . .

For the scenario of RNA updates triggered while the UE is in RRC_INACTIVE state, the UE sends an RRCResumeRequest message with cause value 'ma-update' (or equivalent). In response, if the network is overloaded, it has been agreed that the network can send an RRCReject message containing a wait timer, which corresponds to the flow diagram shown in FIG. 6E. The UE's handing of the RRCReject message is currently specified as:

5.3.13.8 Reception of the RRCReject by the UE
The UE shall:
1> stop timer T314;
1> reset MAC and release the MAC configuration;
1> start timer T302, with the timer value set to the waitTime;
1> if RRCReject is sent in response to an RRCResumeResquest triggered by upper layers;
2> inform upper layers about the failure to resume the RRC connection and access control related information, upon which the procedure ends;

SUMMARY

There is currently no specification of the action(s) to be taken by the UE upon receiving an RRCReject, as shown in FIG. 6E in response to an RRCResumeRequest triggered due, for example, to periodic RNA. The initiation of the resume procedure could be for different reasons, e.g.:
Upon UE entering a cell that does not belong to its configured RNA, the UE shall perform RNA Update i.e. trigger an RRC Resume procedure by sending an RRC Resume Request message with cause value 'ma-update' (or equivalent);
Upon arrival of uplink data the UE shall perform an RRC Resume procedure by sending an RRC Resume Request message with cause value 'mo-data' (or equivalent); or
Upon UE receiving a RAN page message containing the I-RNTI which has been assigned to the UE the UE shall perform an RRC Resume procedure by sending an RRC Resume Request message with cause value 'ran-paging' (or equivalent)
Upon receiving an RRC Reject in response to a Resume Request triggered by the RRC layer such as mobility RNA (i.e., UE entering a cell not belonging to its configured RNA), UL data, RAN paging, there is no description of subsequent action. According to conventional approaches, it is not certain which action the UE would take and what happens with the RRC layer functionality (RNA Update, UL data, RAN page response) in this case. In addition to that, the only described action says that the UE inform upper layers about the failure to resume the RRC connection and access control related information, upon which the procedure ends, while in reality, RNA update and the other procedures are handled by RRC/Access Stratum layer.
In the specific case of mobility RNA updates, sine the RRC Reject may be sent on SRB0, it is also uncertain to the UE whether the network has been updated about the UE location or not, i.e., there might be some uncertainty on how the network should try to reach the RRC_INACTIVE UE via RAN paging.

Another procedure that remains unclear is when the UE has sent an RRC Resume Request for a mobility RNA update, received in response an RRC Reject, started the wait timer, and while the wait timer is running, the UE performs cell reselection possible even to a cell which belongs to the RNA the UE was configured with.

Exemplary embodiments disclosed herein address these problems, issues, and/or drawbacks of existing solutions, by providing new mechanisms for handling UE actions upon receiving an RRC Reject (with wait timer) in response to RRC layer triggered procedures such as a mobility RNAU triggered by the UE entering a cell that is outside the RNA configured for the UE. According to several of the disclosed embodiments, a clear UE behavior upon the reception of an RRC Reject in response to a mobility RNA Update is defined, facilitating network actions in terms of reachability via RAN paging. The techniques may also be used to avoid that the UE ends up in a state or cell where it is no longer reachable by the network and higher layer services. More generally, the mechanisms described herein avoid ambiguity in terms of state mismatch between UE and network.

Exemplary embodiments of the present disclosure include methods and/or procedures for handling area update reports. According to some embodiments, a method in a wireless device includes initiating an RNAU, responsive to detecting that the wireless device has entered a cell not belonging to an RNA configured for the wireless device and receiving, from the wireless network, a message indicating that the wireless device's attempt to perform the RNAU has been rejected. The message includes or is accompanied by an indication that a wait time value is applicable. The method also includes, responsive to the message, setting a reject wait timer to the wait time value. The method further includes performing the RNAU upon expiry of the reject wait timer. In some embodiments, the wireless device also sets a periodic RNAU timer to the wait time value, responsive to the message, and performs the RNAU upon expiry of the reject wait timer and the periodic RNAU timer.

According to some embodiments, a method in a wireless device operating in a wireless network for handling area update reports includes initiating a combined RNAU and TAU, responsive to detecting that the wireless device has entered a cell not belonging to an RNA configured for the wireless device and not belonging to a tracking area configured for the wireless device. The method includes receiving, from the wireless network, a message indicating that the wireless device's attempt to perform the combined RNAU and TAU has been rejected. The message includes or is accompanied by an indication that a wait time value is applicable. The method also includes, responsive to the message, setting a reject wait timer to the wait time value and subsequently performing a cell reselection, prior to expiry of the periodic RNAU timer. The method further includes immediately performing a TAU, subsequent to the cell reselection.

According to some embodiments, a method in a wireless device operating in a wireless network for handling area update reports includes initiating a RNAU, responsive to detecting that the wireless device has entered a cell not belonging to an RNA configured for the wireless device. The method also includes receiving, from the wireless network, a message indicating that the wireless device's attempt to perform the RNAU has been rejected, the message comprising or being accompanied by an indication that a wait time value is applicable. The method further includes, responsive to the message, setting a reject wait timer to the wait time value, and notifying the wireless device's RRC layer of the rejection.

According to some embodiments, a method in a wireless device operating in a wireless network for handling area update reports includes initiating an RNAU, responsive to detecting that the wireless device has entered a cell not belonging to an RNA configured for the wireless device. The method includes receiving, from the wireless network, a message indicating that the wireless device's attempt to perform the RNAU has been rejected, the message comprising or being accompanied by an indication that a wait time value is applicable. The method further includes, responsive to the message, tracking the rejected RNAU as a pending notification, such that the rejected RNAU is attempted again as soon as allowed and/or as soon as certain conditions are met.

Other exemplary embodiments include radio nodes in the cellular network (e.g., radio nodes (e.g., base stations, low-power nodes, wireless devices, user equipment, etc.) configurable to perform operations corresponding to the exemplary methods and/or procedures described above. Other exemplary embodiments include non-transitory, computer-readable media storing program instructions that, when executed by at least one processor, configure such radio nodes to perform operations corresponding to the exemplary methods and/or procedures described above.

These and other objects, features and advantages of the exemplary embodiments of the present disclosure will become apparent upon reading the following detailed description of the exemplary embodiments of the present disclosure.

DETAILED DESCRIPTION

Figure 1:
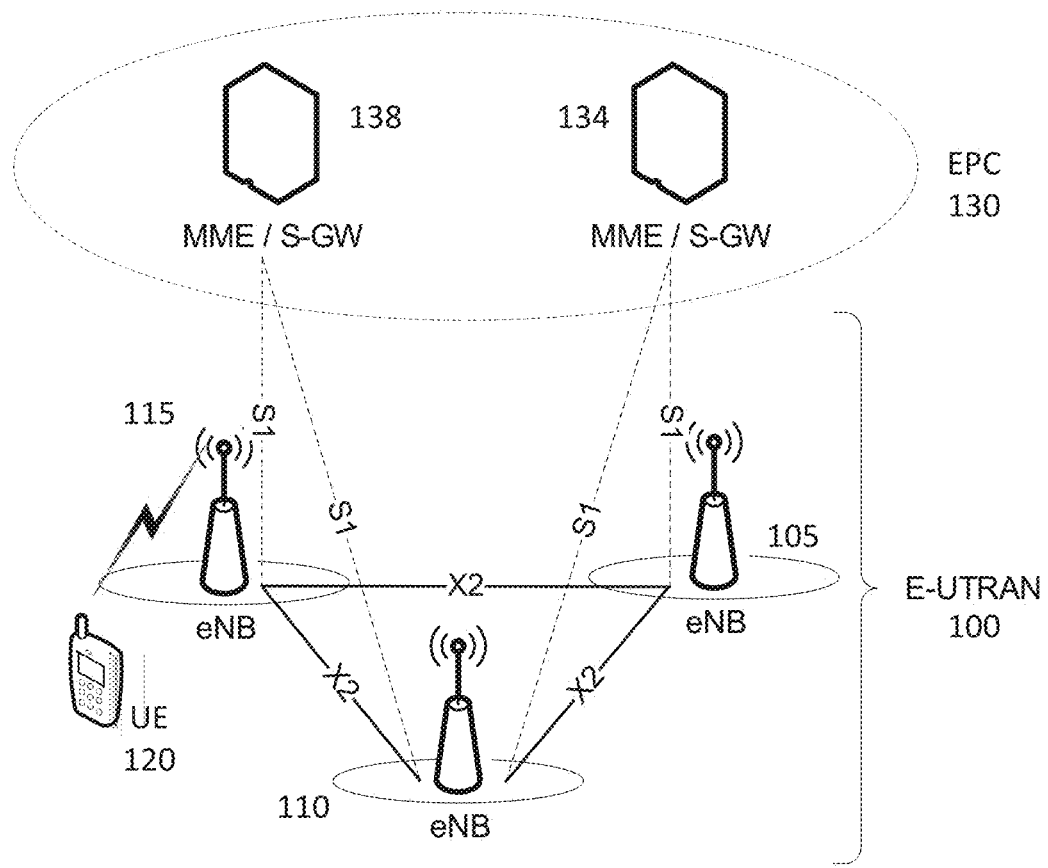
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
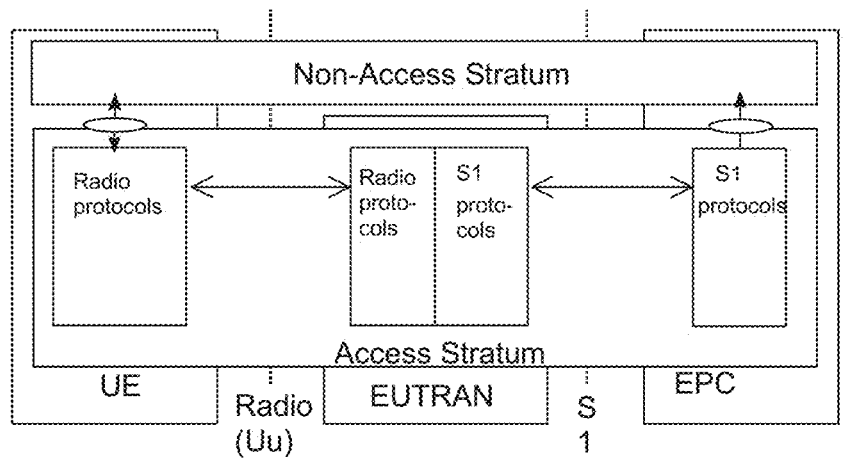
FIG. 2A is a high-level block diagram of an exemplary E-UTRAN architecture in terms of its constituent components, protocols, and interfaces.
Figure 2B:
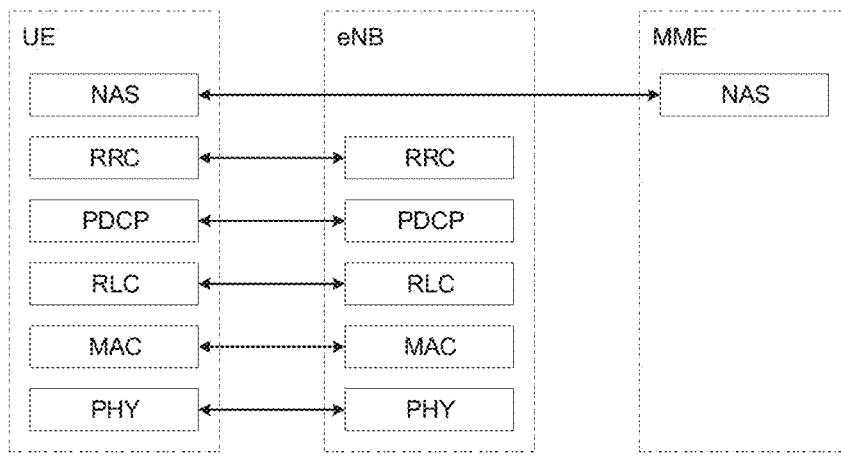
FIG. 2B is a block diagram of exemplary protocol layers of the control-plane portion of the radio (Uu) interface between a user equipment (UE) and the E-UTRAN.
Figure 2C:
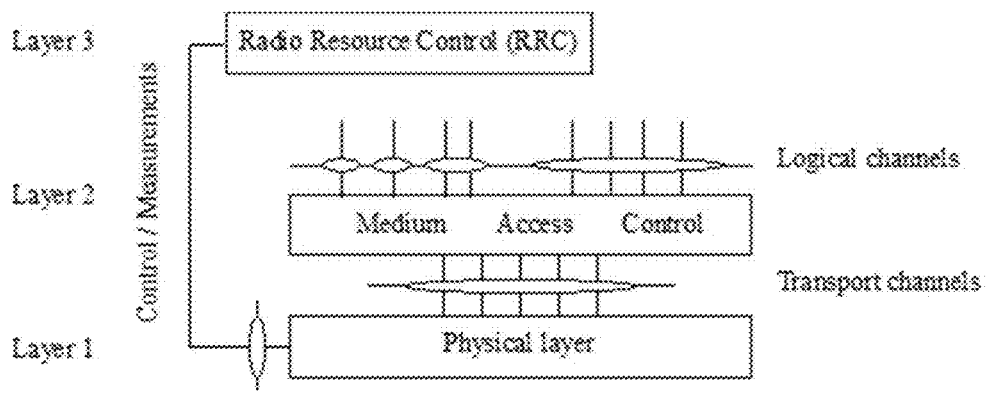
FIG. 2C is a block diagram of an exemplary LTE radio interface protocol architecture from the perspective of the PHY layer.
Figure 3A:
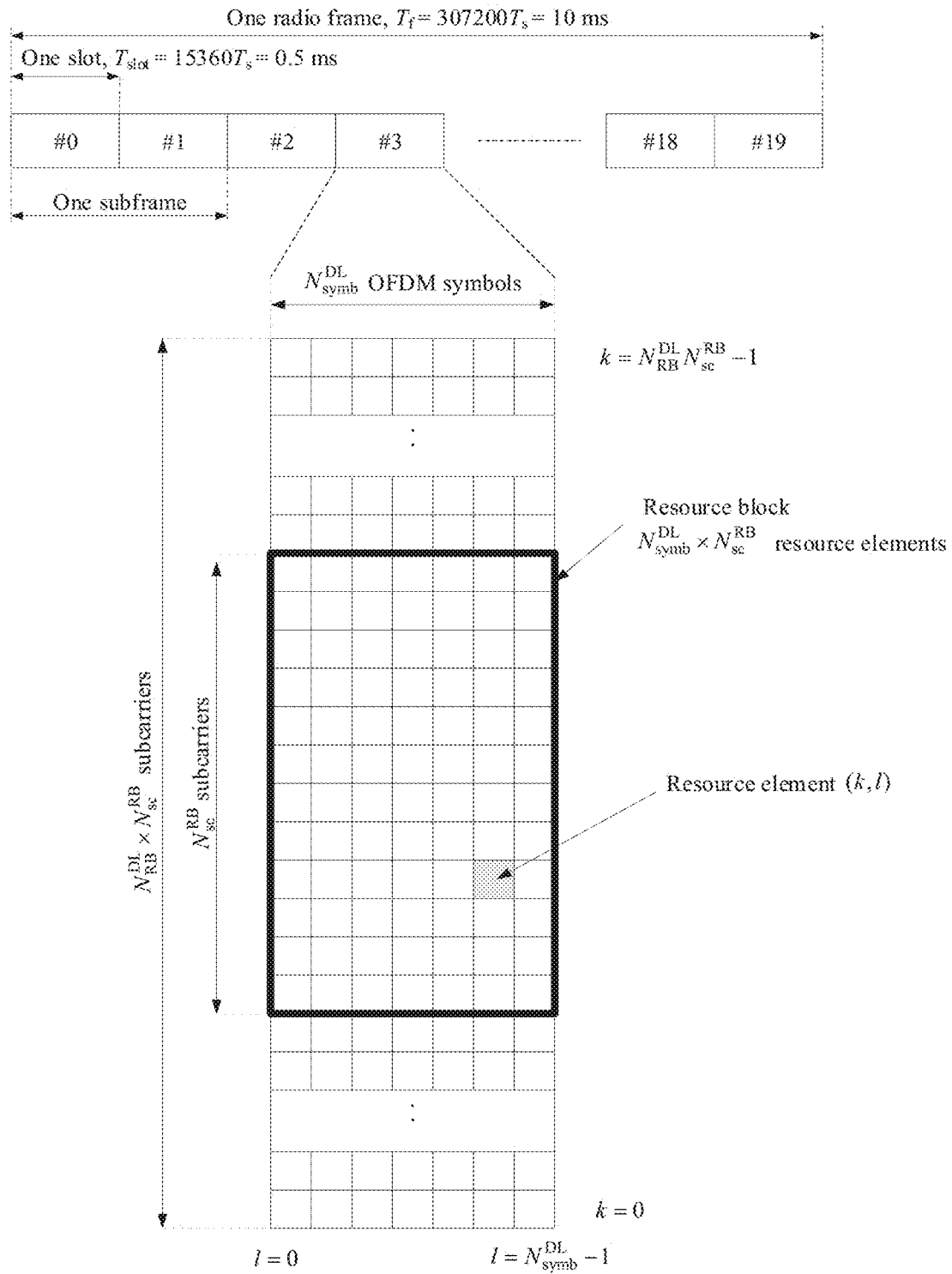
FIGS. 3A and 3B are block diagrams of exemplary downlink and uplink, respectively, LTE radio frame structures used for frequency division duplexing (FDD) operation.
Figure 3B:
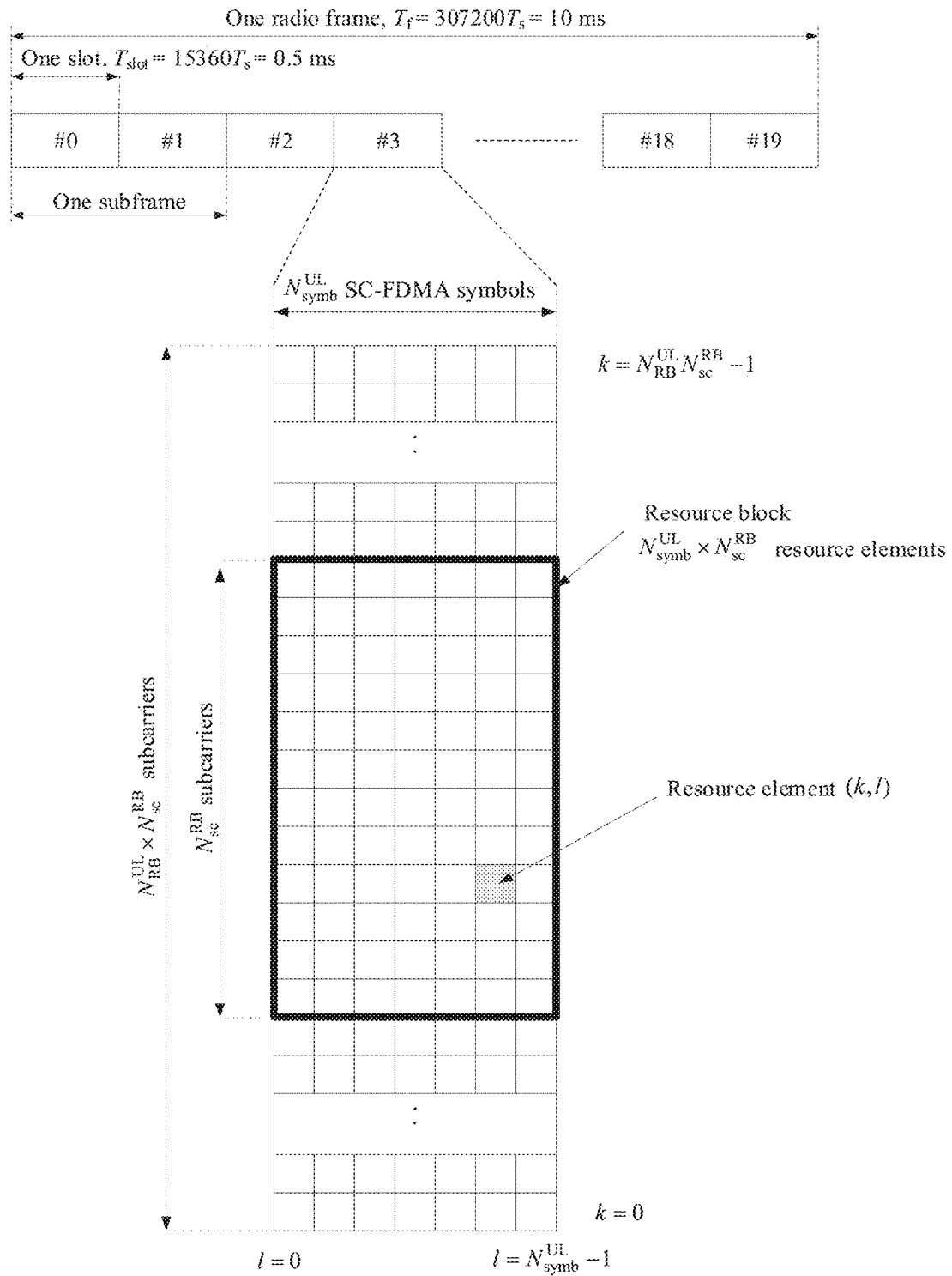
Figure 4:
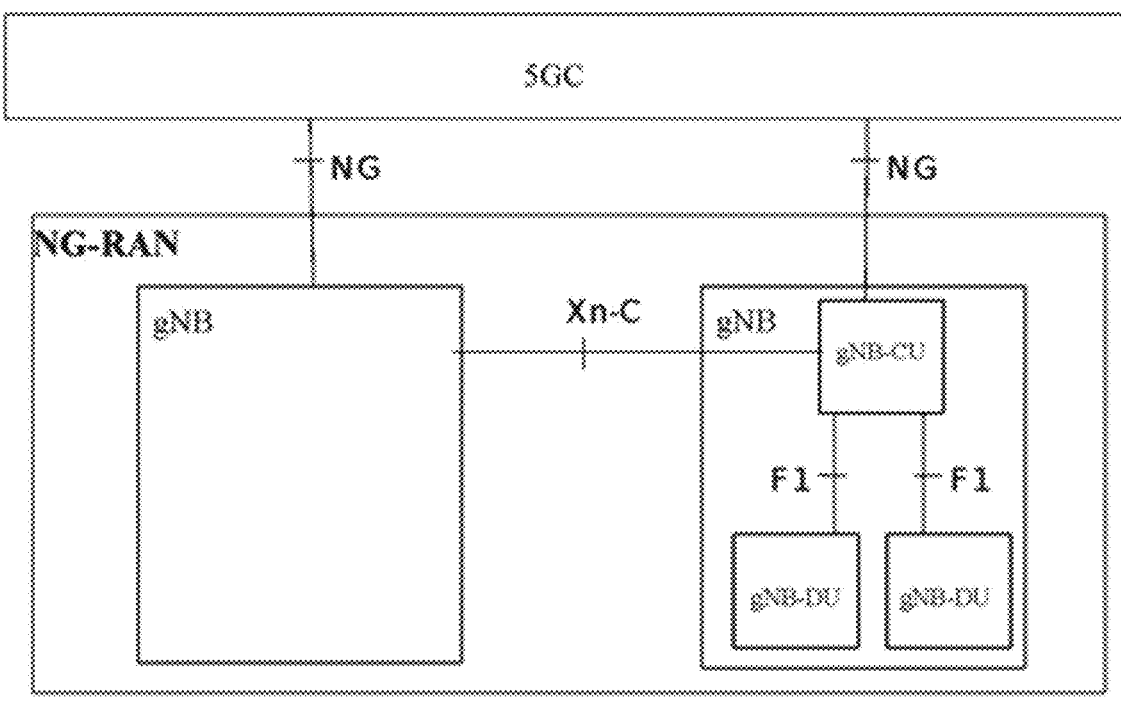
FIG. 4 shows a block diagram of an exemplary 5G logical network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR concepts) beams may be used instead of cells and, as such, concepts described herein apply equally to both cells and beams.

Various exemplary embodiments are described herein as methods, procedures, and/or operations performed by a UE in RRC_INACTIVE state in an NR network. These embodiments are used for the purpose of illustration only, without limitation. For example, principles of these embodiments are equally applicable to other configurations, scenarios, and/or network types included, but not limited to:

UEs in RRC_INACTIVE state in LTE networks;

UE inter-RAT procedures in RRC_INACTIVE, mainly between LTE and NR RANs connected to the same CN (5G Core Network). In these scenarios, the periodic RNA update timer, T380, is defined as an inter-RAT timer (i.e., it keeps running even when UE is changing RAT). If T380 expires when the UE is in the other RAT, the UE will perform periodic RNA update in that RAT. These inter-RAT scenarios include:

UE in LTE RRC_CONNECTED is suspended to LTE RRC_INACTIVE, starts T380, performs mobility management and camps on an NR cell (i.e. becomes RRC_INACTIVE in NR). While in NR, T380 expires and UE tries to perform an RNA update (with a resume request) in NR. Network can respond with an RRCReject.

UE in NR RRC_CONNECTED is suspended to NR RRC_INACTIVE, starts T380, performs mobility management, and camps on an LTE cell (i.e. becomes RRC_INACTIVE in LTE). While in LTE, T380 expires and UE tries to perform an RNA update (with a resume request) in NR. Network can respond with an RRCReject.

Various exemplary embodiments are described herein as methods, procedures, and/or operations performed by a UE upon receiving an RRCReject message with a wait timer. These embodiments are used for the purpose of illustration only, without limitation. For example, principles of these embodiments are equally applicable to other configurations, scenarios, and/or network types involving a "reject functionality" by the network but without using this exact message. For example, an RRC Release or RRC Release with suspend configuration may also include a wait timer indicating that the UE shall not access the system until that timer expires (or the UE performs cell reselection). In the event that the system supports the "reject functionality" via RRCReject or RRC Release, there may also be differences in UE behavior depending which message the network uses to respond to the UE. For example, the RRCReject is typically sent using SRB0, which is unprotected, while RRC Release with suspend indication (or equivalent message) moving UEs to RRC_INACTIVE state uses SRB1, which is protected and secure. These aspects are discussed later with respect to various embodiments.

Also notable is that the specific techniques described below are described in the context of mobility-triggered RNA updates. The techniques, however, may be also applicable to other scenarios in which the RRC resume procedure is triggered, e.g., in response to a RAN page or the availability of uplink (UL) data.

In a first approach, comprising several possible embodiments, the UE, which may be more generally referred to as a wireless device, sets the periodic RNAU timer to the wait timer value, upon receiving a message rejecting the UE with a wait time (e.g., RRC Reject or Release with a wait timer), where the message is in response to a mobility RNA update (e.g., triggered by the UE entering a cell not belonging to its configured RNA). The UE starts the reject wait timer (e.g., T302 in NR draft specifications), sets the periodic RNAU timer T380 to the same value used to set the wait timer T302, and starts the periodic RNAU timer. Consequently, the UE performs a periodic RNAU attempt immediately after the wait timer T302 expires. This approach is particularly useful in the event that the rejecting message is sent on SRB0, since if this message was sent in SRB1, instead, the network would be able to update the context and explicitly provide a periodic RNAU timer. One advantage of setting the periodic RNAU timer to the wait timer is that the UE behaves according to the behavior defined according to the periodic RNAU timer, without the need to specify exceptional actions, and without making the mobility RNAU pending. This may speed up the notification that the UE has changed RNAs, in many circumstances It may be observed that by setting the periodic RNAU timer to the wait timer, the UE will not perform a mobility RNAU upon cell reselection, even though the wait timer will expire and the UE is then allowed to access the system. This may be considered an especially useful result if it is desired to avoid unnecessary signaling, with necessary paging in this situation handled via core network paging.

From a network perspective, it may be observed that the described UE behavior may lead to the network not receiving a mobility RNAU when the UE enters a cell not belonging to its configured RNA. However, since the network knows that a Reject may occur due to Reject in a specific cell without necessarily updating the UE context about that Reject occurrence, the network may still assume the UE is in coverage, although possibly not in its configured RNA. The network may be configured to try to page the UE in the configured TAI list, for example, if the initial attempt in the UE's RNA fails. Hence, the network may anyway try to page the UE with RAN paging.

In a variant of the approach described above, the UE sets the periodic RNAU timer to the value of the wait timer only if it receives an indication in the RRC Reject message from the network. That indication may be something the network sets if it has the UE context available but still prefers to reject the UE.

In another variant to the above approaches, upon receiving the rejecting message in response to a mobility RNA update, the UE starts the reject wait timer (e.g., T302 in NR draft specifications), re-starts the periodic RNAU timer to a default value, and notifies RRC layer.

In yet another variant to the above approaches, a slightly different behavior can be defined in the event that the rejected mobility RNAU is actually a combined mobility RNAU and TAU. Upon receiving the rejecting message in response to a mobility RNA update, the UE starts the reject wait timer (e.g., T302 in NR draft specifications), re-starts the periodic RNAU timer to a value, and notifies RRC layer. If cell reselection occurs, the UE immediately perform a Tracking Area Update.

According to another set of techniques, the concept of a pending notification is applied to the problems discussed above. In some embodiments, then, upon receiving the rejecting message (e.g., RRC Reject with wait timer) in response to a mobility RNA update (or other Resume cases), the UE starts the reject wait timer (e.g., T302 in NR draft specifications), and notifies RRC layer, so that the RRC layer (or AS layer) makes that mobility RNA update (or other Resume cases e.g. UL data, RAN page response) a pending notification that is tracked by the UE.

By making that a pending notification, the UE attempts to re-perform Resume procedure as soon as the UE is allowed to. For example:

Upon the expiry of the wait timer T302, the RRC layer (or AS layer) requests the UE to perform the pending Resume procedure (e.g., mobility RNAU).

In a variant, that subsequent Resume procedure, which was pending, contains an indication that this is not the first attempt but a pending notification. That may indicate to the network that this is a late notification. This may be useful in case the network has tried to page the UE without success in its RNA while T302 was running (i.e., the UE was rejected upon trying to perform a mobility RNA in the cell not belonging to its configured RNA).

From a network perspective (e.g., for the mobility-triggered RNAU case), it may be observed that by making the mobility RNAU pending at the UE, the network knows it should receive the mobility RNAU as soon as the UE is allowed to send it, which may simplify the network's RAN paging action. While T302 is running, the network may try to page the UE in its RNA without a UE response, but it can subsequently try CN paging to reach the UE in a cell not belonging to its RNA. An additional problem may occur if that mobility RNA is a combined RNA with TAU, i.e., where the UE is in a cell that is not within its TAI list. In that case, the following variants are defined:

If the mobility RNAU that is pending is a combined RNAU and TAU, i.e. UE is crossing the RNA border and the TAU border at the same time, the resume request has a cause value 'mo-signalling' and should have higher priority in the access control policies otherwise the UE may become unreachable for both RAN and CN paging. Another variant is to define a cause value for this combined RNA/TAU instead of simply saying this is mo-signalling. Another alternative is the network implementation prioritize these resume request.

In some circumstances, the first allowed opportunity to re-perform the Resume procedure may be upon cell reselection, upon which the UE performs the pending Resume procedure (e.g., mobility RNAU) in various embodiments. In a variant, this subsequent Resume procedure may contain an indication that this is not the first attempt. That may be useful to the network in case the UE attempts to performs mobility RNAU because it has entered a cell not in its configured RNA, it is rejected by the network and starts T302, and, performs cell reselection to a cell that is within its configured RNA again while T302 is running.

From a network perspective, it may be observed that the UE may re-select to a cell that is again within its configured RAN. However, sending the pending RNA allows the network to figure out what has happened, e.g., in the event that the network tried to page the UE via RAN paging and the UE has not responded.

In another variant to the above approaches where the Resume procedure becomes pending, the timer T380 is not modified upon the reception of the rejecting message, in some embodiments, which may simplify network implementation since the network may still wait for periodic RNAUs regardless of the rejecting scenarios.

In some embodiments, the pending procedure is changed due to changing of any of the following conditions:
the UE enters a new cell,
the UE gets a higher priority procedure, or
the UE is forbidden to access target cell.

According to another set of techniques, closely related to those described immediately above, the Resume procedure becomes pending only under certain conditions. In some embodiments, upon receiving the rejecting message (e.g. RRC Reject with wait timer) in response to a Resume request message, the UE starts the reject wait timer (e.g. T302 in NR draft specifications), and notifies RRC layer, so the RRC layer (or AS layer) makes that Resume procedure a pending notification. but it does not necessarily trigger the pending Resume procedure when it is allowed, only when certain conditions are fulfilled, as described below:

Upon the expiry of the wait timer T302, the UE only performs the pending mobility RNAU again if upon the timer expires the UE is still camping on a cell that is not within its configured RNA. If upon the timer expiry the UE is in its configured RNA, the UE discards the pending mobility RNA update.

Upon cell reselection, the UE performs the pending mobility RNAU only if the new cell does not belong to its configured RNA. In other words, if the UE performs cell reselection while T302 is running and the new cell belongs to the UE's configured RNA, the UE discards the pending mobility RNA update.

Upon cell reselection and/or the expiry of the wait timer T302 only if the pending mobility RNAU is a combined RNA and Tracking Area Update, i.e., the UE performs the pending mobility RNAU. In another variant of this approach, upon cell reselection and/or the expiry of the wait timer T302 only if the pending mobility RNAU is a combined RNA and Tracking Area Update, i.e., the UE performs a Tracking Area Update instead of the mobility RNAU, since that enables the UE to update both RAN and CN of its location.

Upon a higher priority even is triggered in the UE (e.g., emergency call) the pending Resume procedure is either re-triggered again (regardless of whether T302 is running) or the pending Resume procedure is discarded and instead only the higher priority procedure is performed.

Upon cell reselection if the UE selects a cell which not considered a suitable cell for camping (e.g. UE is forbidden to access the cell). In this case the pending Resume procedure may be discarded, or performed at a later stage when UE selects a suitable cell.

In another variant of the approaches where the Resume procedure becomes pending, the timer T380 is not modified upon the reception of the rejecting message, which may simplify network implementation as the network may still wait for periodic RNAUs regardless of the rejecting scenarios.

In yet another set of approaches, the Resume procedure is not pending. According to some embodiments, upon the expiry of the wait timer T302, the UE does not have to immediately send a Resume procedure (i.e., the message is not considered pending by RRC and/or the higher layers), but simply relies on the actions related to the Resume procedure upon receiving the message rejecting the UE. That may create a temporary reachability issue from the network side that could be solved via CN paging. On the other hand, it may simplify significantly the UE behavior.

In some embodiments, upon reject, the UE notifies higher layer and upon T302 expiry the UE perform Resume procedure. After receiving a reject message after trying to perform a mobility RNAU or other Resume procedure, the UE notifies the higher layers and, upon the expiry of the wait timer T302, the UE immediately performs a Tracking Area Update/Registration Area Update or other NAS recovery procedure. In this way the UE—RAN state would be re-build from the Core Network. This solution is useful e.g. if the UE has moved into a different CN area and has been unreachable from the network during the wait time.

In a variant of this latter approach, upon the expiry of T302, the UE discards the UE context, enters RRC_IDLE from RRC_INACTIVE, and performs the NAS level procedure.

In some embodiments, when the UE is rejected upon trying to perform a mobility RNAU, the UE starts the wait timer T302 and continues to monitor RAN paging notifications according to its stored configuration (provided when the UE was moved to RRC_INACTIVE, i.e., not in the message rejecting the UE). The UE continues to monitor RAN paging, since the network may either know the current UE location (current cell that it is camping) despite the rejection of the mobility RNA update.

In corresponding embodiments from a network perspective, if the network is aware of the UE location after rejecting a request of RNA update, the network may perform RAN paging in the new cell the UE is camping on (i.e., the cell the UE was rejected) despite that the camping cell does not necessarily belong to the configured RNA of that UE.

In some embodiments, when the UE is rejected upon trying to perform a mobility RNAU, the UE starts the wait timer T302 and stops monitoring RAN paging notifications according to its stored configuration (provided when the UE was moved to RRC_INACTIVE, i.e., not in the message rejecting the UE) and only monitors CN paging. UE continues to monitor CN paging to save battery, as the network may anyway not know the current UE location (current cell that it is camping).

In corresponding embodiments from a network perspective, the rejecting message is send on SRB0, the network may reject the UE without updating the UE context. Hence, the node where the UE has tried to perform the mobility RNAU may not even try to fetch the context. And, if a paging notification comes in the node where the context is, the node may try RAN paging in the UE's configured RNA and if that fails, the network may actually try CN paging. As the RAN paging will anyway fail, upon entering the new RNA and being rejected it might be useful not to continue monitoring RAN paging for the UE as network may not try that anyway.

In yet other embodiments, the network may include in the Reject message an indication to the UE on whether the UE shall continue to perform RAN paging or not. That indication is basically a way to indicate the UE that the node having the UE context is aware of the UE's location on a cell level.

In some embodiments, the UE stores information about the reception of messages rejecting the UE from the network. The information about the rejection may contain, for example:
A counter that is incremented at each rejected attempt. That counter may be specific per cause value, i.e., in this specific case for periodic RNAUs.

The exact location where the UE was rejected, for example, adding to the report the PCI and/or cell identifier and/or global cell identifier and/or PLMN for each rejected attempt.

The information described above may be used in different ways. For example, a report can be created from that stored information and reported to the network when the UE enters RRC_CONNECTED. Another usage could be to use the information as input to an access control function so that if a RNAU is triggered while T302 is running, depending on the number of frustrated attempts of RNAUs, access control function may authorize the UE to send a resume request with RNAU.

In other embodiments, a protection mechanism is defined where after X RNAU attempts followed by network reject (where X can either be fixed by the standard or configurable), the UE perform different actions:

- In one variant, the UE discards its UE context and notifies the higher layers and/or the RRC layer. Then, immediately after the UE can access the network again (e.g. upon the expiry of T302 or upon cell reselection) it performs a NAS recovery;
- In another variant, the UE performs inter-frequency cell reselection or inter-RAT cell reselection and tries to perform a periodic RNAU.

Some of the techniques described above may be implemented in the NR RRC specifications as follows. First, the approaches where the periodic RNAU timer is re-started may be implemented according to:

---

.3.13.8 Reception of the RRCReject by the UE
The UE shall:
  1> stop timer T314;
  1> reset MAC and release the MAC configuration;
  1> start timer T302, with the timer value set to the waitTime;
  1> re-start the periodic RNAU timer T380 to the value set to waitTime;
  1> if RRCReject is sent in response to an RRCResumeResquest triggered by upper layers;
    2> inform upper layers about the failure to resume the RRC connection and access control related information, upon which the procedure ends;

---

Embodiments where the mobility RNAU becomes pending may be implemented according to:

---

Figure 7:
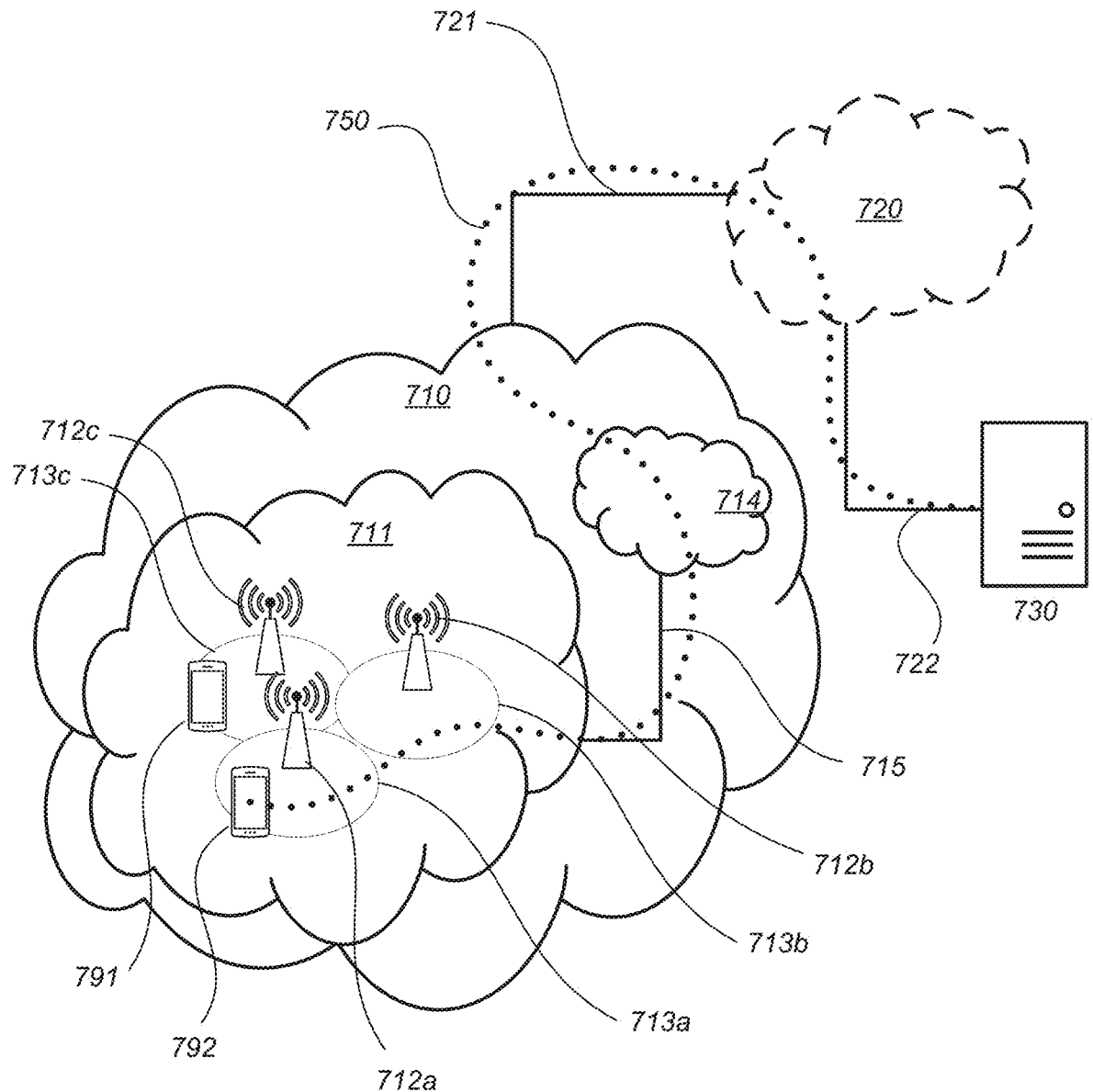
FIG. 7 illustrates an example communication system, according to some embodiments.

5.3.13.8 Reception of the RRCReject by the UE
The UE shall:
  1> stop timer T314;
  1> reset MAC and release the MAC configuration;
  1> start timer T302, with the timer value set to the waitTime;
  1> stop T380, if running;
  1> if RRCReject is sent in response to an RRCResumeResquest triggered by upper layers;
    2> inform upper layers about the failure to resume the RRC connection and access control related information, upon which the procedure ends;
  1> if RRCReject is sent in response to an RRCResumeRequest due to mobility (i.e. upon entering a cell not belonging to its configured RNA);
    2> inform RRC layer (or AS layer) about the failure to resume the RRC connection and access control related information (i.e. due to reject with wait timer), which will consider the RNAU as pending, upon which the procedure ends;
. . .
5.3.13.6 Cell re-selection while T314 or T302 is running
The UE shall:
  1> if cell reselection occurs while T314 or T302 is running:
    3> stop timer T314 if running;
    3> stop timer T302 if running;
    3> reset MAC, release the MAC configuration and re-establish RLC for all RBs that are established;
    3> discard the temporary security context (previously restored) and the keys $K_{RRCenc}$ key, the $K_{RRCint}$, the $K_{UPint}$ key and the $K_{UPenc}$;
    3> perform the RRC resume procedure procedure as specified in 5.3.13;
5.3.13.x T302 expires or is stopped (e.g. upon cell reselection):
The UE shall:
  1> if timer T302 expires or is stopped (e.g. upon cell reselection):
    2> inform upper layers about barring alleviation for mobile terminating access and trigger any pending RNA updates;

Embodiments where, upon, reject, the UE notifies higher layers and upon T302 expiry the UE performs tracking area update may be implemented as follows:

5.3.13.8 Reception of the RRCReject by the UE
The UE shall:
1> stop timer T314;
1> reset MAC and release the MAC configuration;
1> start timer T302, with the timer value set to the waitTime;
1> if RRCReject is sent in response to an RRCResumeResquest triggered by upper
    layers;
    2> inform upper layers about the failure to resume the RRC connection and
       access control related information, upon which the procedure ends;
. . .
5.3.13.6 Cell re-selection while T314 or T302 is running
. . .
The UE shall:
1> if cell reselection occurs while T314 or T302 is running:
        3> stop timer T314 if running;
        3> stop timer T302 if running;
        3> reset MAC, release the MAC configuration and re-establish RLC for all
           RBs that are established;
        3> discard the temporary security context (previously restored) and the keys
           KRRCenc key, the KRRCint, the KUPint key and the KUPenc;
        3> if an RRCResumeRequest is pending (e.g. due to access control);
            4> perform the RRC resume procedure procedure as specified in
               5.3.13;
5.3.13.x T302 expiry or stop
The UE shall:
1> if timer T302 expires or is stopped (e.g. upon cell reselection):
    2> inform upper layers about barring alleviation for mobile terminating access
       and trigger any pending RNA updates;

FIG. 7, in accordance with various embodiments, shows a communication system that includes a telecommunication network 710, such as a 3GPP-type cellular network, which comprises an access network 711, such as an gNB-RAN, and a core network 714 (e.g., 5GC). The access network 711 comprises a plurality of base stations 712a, 712b, 712c, such as gNBs or other types of wireless access points, each defining a corresponding coverage area 713a, 713b, 713c. Each base station 712a, 712b, 712c is connectable to the core network 714 over a wired or wireless connection 715. A first user equipment (UE) 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
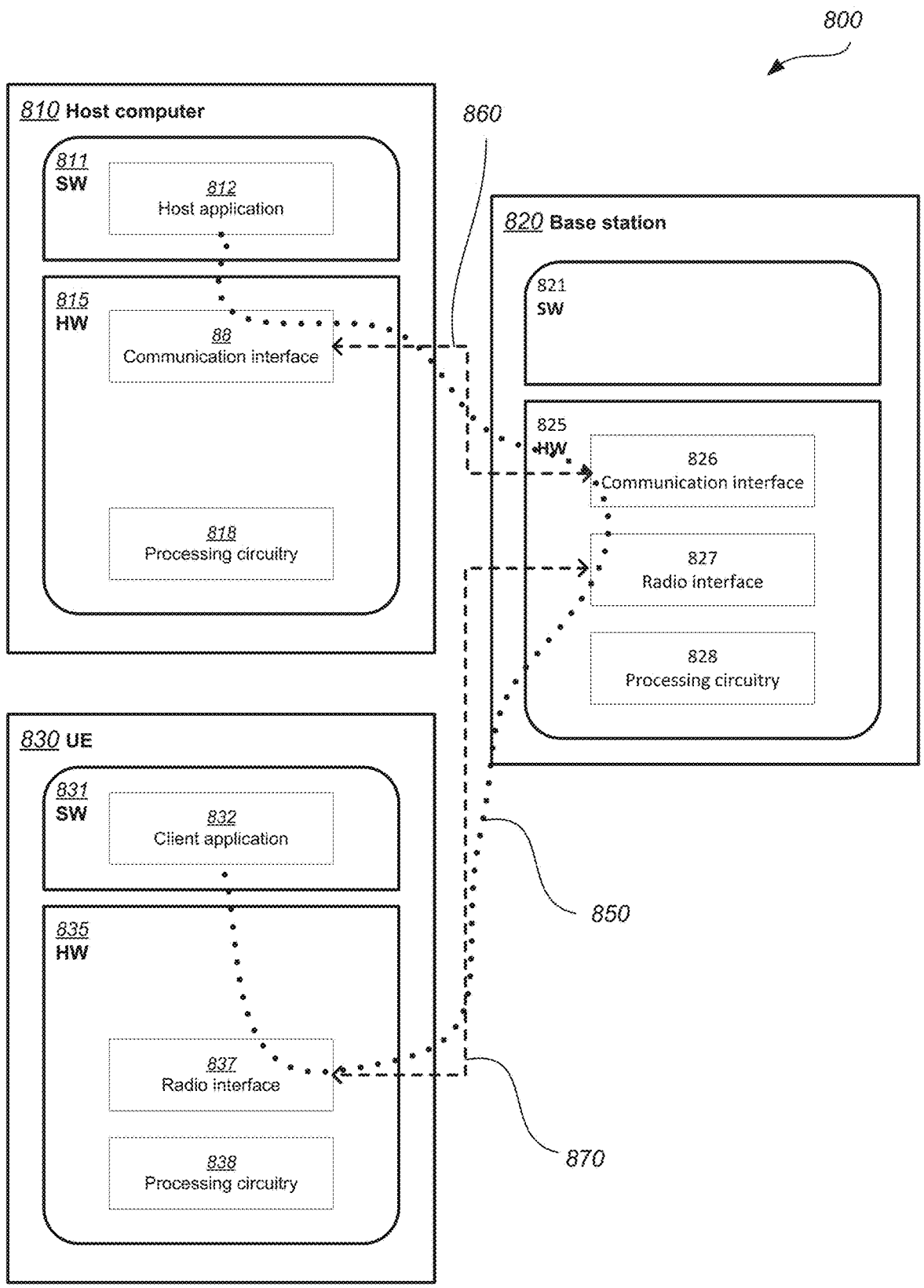
FIG. 8 is a generalized block diagram of a host computer communicating via a base station with a user equipment over a partially wireless connection, according to some embodiments.

It is noted that the host computer 810, base station 820 and UE 830 illustrated in FIG. 8 may be identical to the host computer 730, one of the base stations 712a, 712b, 712c and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further make decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, a clear UE behavior upon the reception of an RRC Reject in response to a mobility RNA Update is defined, facilitating network actions in terms of reachability via RAN paging. The techniques may also be used to avoid that the UE ends up in a state or cell where it is no longer reachable by the network and higher layer services. More generally, the mechanisms described herein avoid ambiguity in terms of state mismatch between UE and network. These embodiments will result in improved performance, such as better and/or more consistent throughput, and/or reduced delays, for users of the RAN.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above or by supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figure 9:
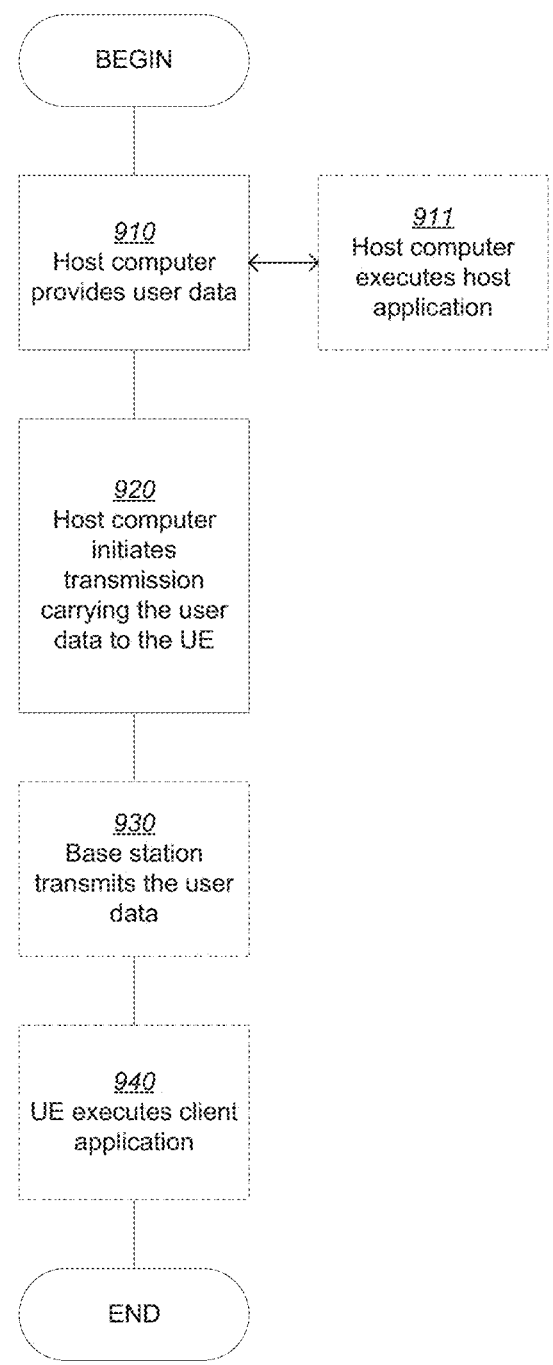
FIG. 9-12 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

Figure 10:
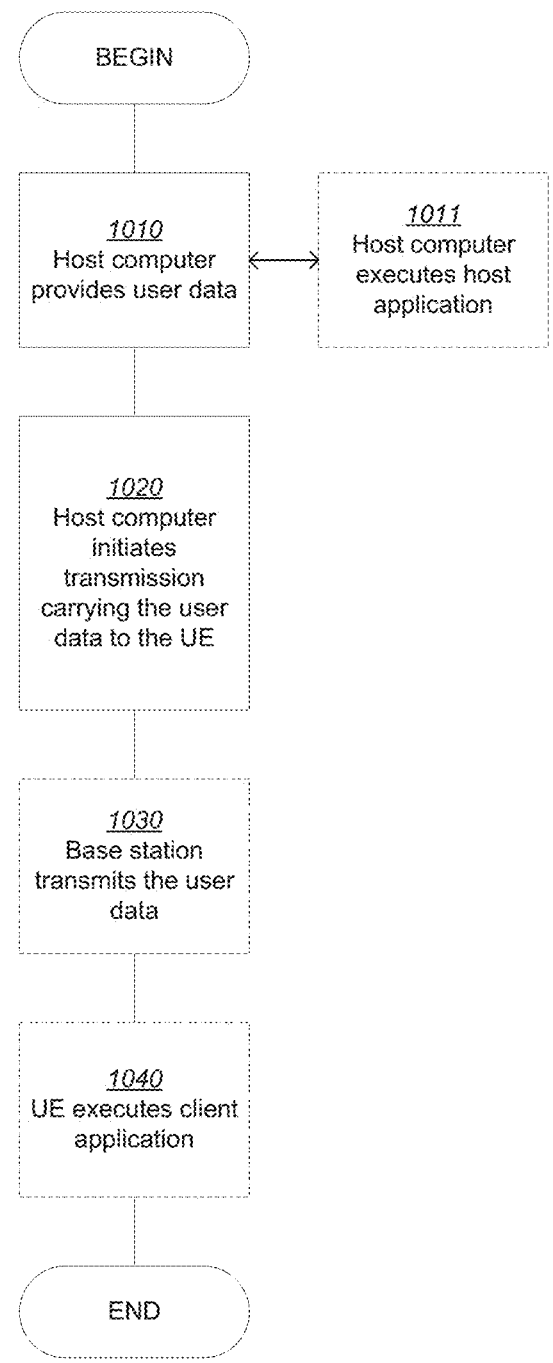

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown), the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figure 11:
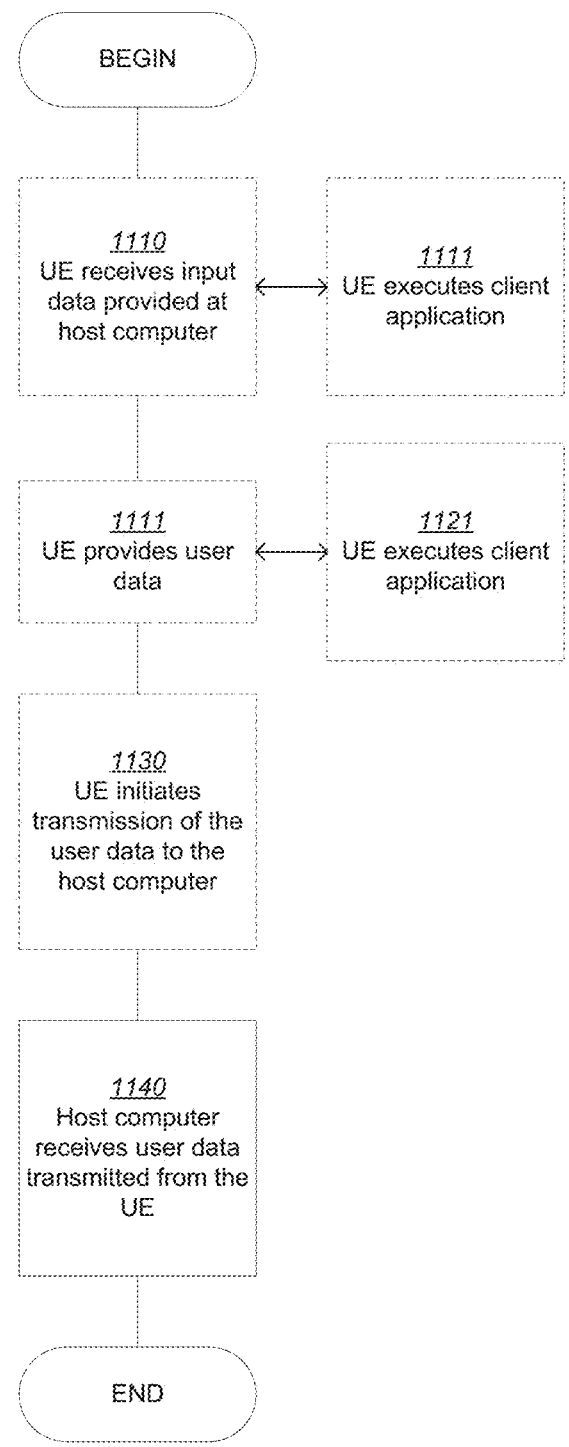

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 2010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

Figure 12:
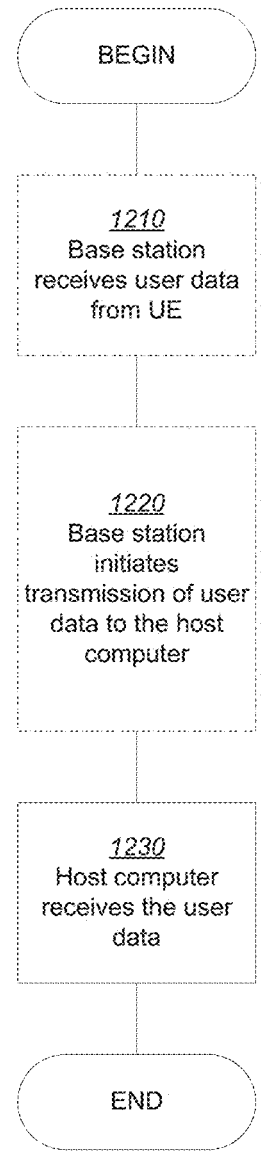

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

Figure 13:
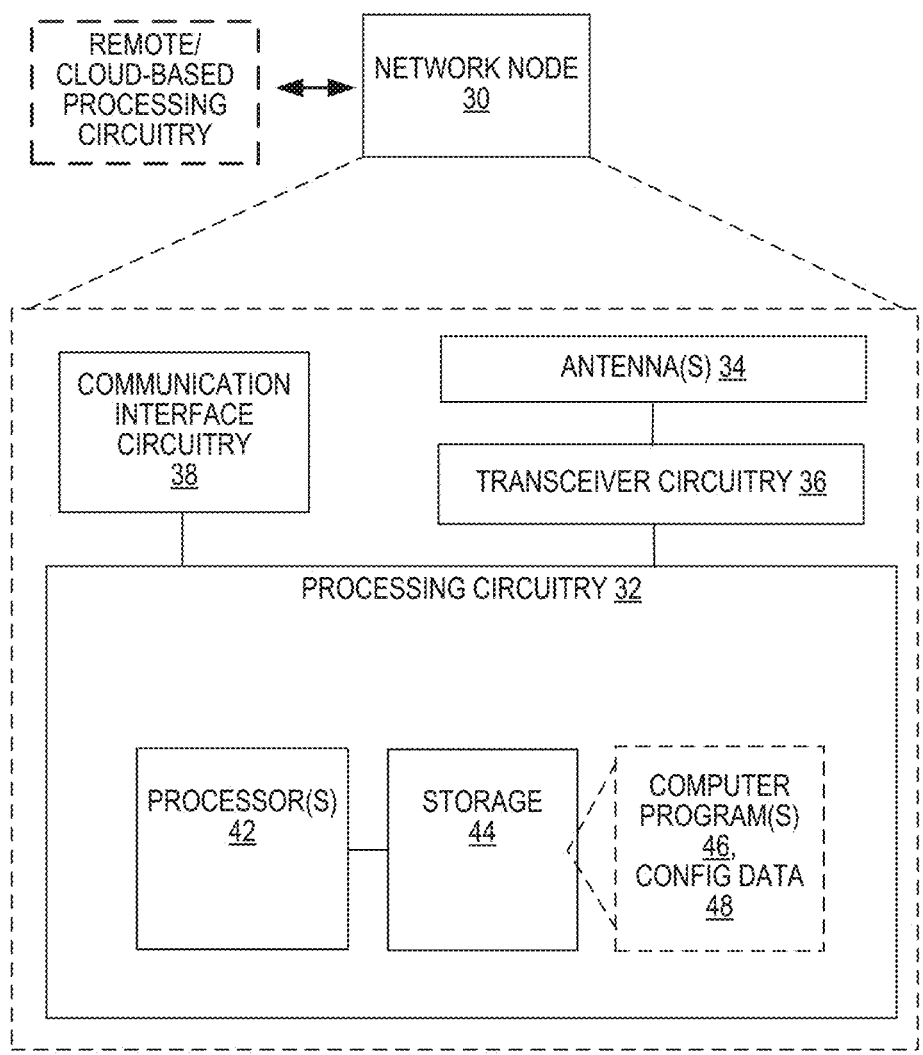
FIG. 13 is a block diagram illustrating an example network node, according to some embodiments.

FIG. 13 is a block diagram illustrating an example network node 30, which may be configured to operate as a base station. The network node 30 may be one of multiple network nodes in a cloud-based system that carry out the described techniques. The network node 30 may be, for example, an eNB or a 5G gNB. The network node 30 provides an air interface to a wireless device, e.g., 5G air interface for downlink transmission and uplink reception, which is implemented via antennas 34 and transceiver circuitry 36. The transceiver circuitry 36 includes transmitter circuits, receiver circuits, and associated control circuits that are collectively configured to transmit and receive signals according to a radio access technology, for the purposes of providing cellular communication, or WLAN services if necessary. According to various embodiments, cellular communication services may be operated according to any one or more of the 3GPP cellular standards, GSM, GPRS, WCDMA, HSDPA, LTE, LTE-Advanced and 5G. The network node 30 also include communication interface circuitry 38 for communicating with nodes in the core network, other peer radio nodes, and/or other types of nodes in the network.

The network node 30 also includes one or more processing circuits 32 that are operatively associated with and configured to control the communication interface circuitry 38 and/or the transceiver circuitry 36. The processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any combination thereof. More generally, the processing circuitry 32 may comprise fixed circuitry, or programmable circuitry that is specially configured via the execution of program instructions implementing the functionality taught herein or may comprise some combination of fixed and programmable circuitry. The processor(s) 42 may be multi-core.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuitry 32 and/or separate from the processing circuitry 32. In general, the memory 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

In some embodiments, the processing circuitry 32 of one or more network nodes 30 connected to a wireless network is configured to perform operations for handling area update reports with respect to the wireless network in the techniques described herein.

Figure 14:
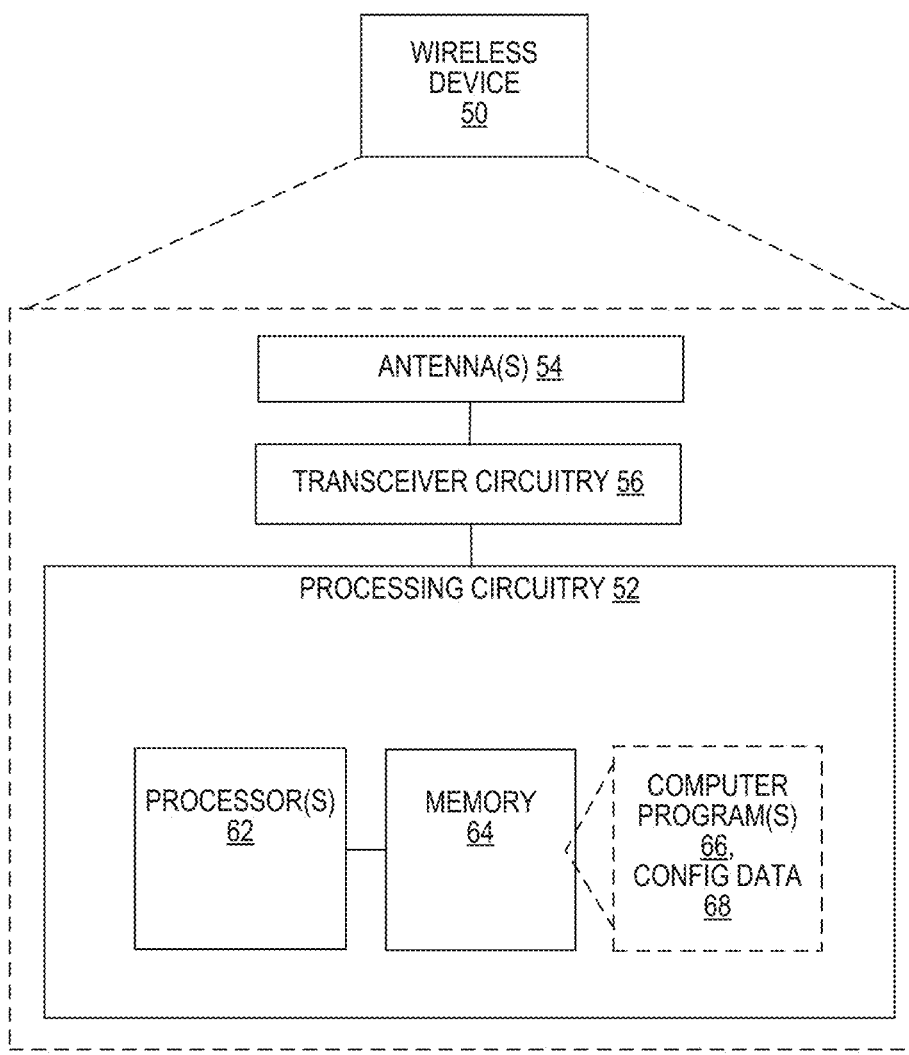
FIG. 14 is a block diagram illustrating an example wireless device, according to some embodiments.

FIG. 14 illustrates an example of the corresponding wireless device 50 that is configured to perform the techniques described herein for the wireless device for handling measurement configurations. The wireless device 50 may also be referred to, in various contexts, as a radio communication device, a UE, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The wireless device 50 communicates with one or more radio nodes or base stations, such as one or more network nodes 30, via antennas 54 and a transceiver circuitry 56. The transceiver circuitry 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with and control the radio transceiver circuitry 56. The processing circuitry 52 comprises one or more digital processing circuits, e.g., one or more microprocessors, microcontrollers, DSPs, FPGAs, CPLDs, ASICs, or any mix thereof. More generally, the processing circuitry 52 may comprise fixed circuitry, or programmable circuitry that is specially adapted via the execution of program instructions implementing the functionality taught herein or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 52 and/or separate from processing circuitry 52. In general, the memory 64 comprises one or more types of computer-readable storage media providing non-transitory storage of the computer program 66 and any configuration data 68 used by the wireless device 50.

Accordingly, in some embodiments, the processing circuitry 52 of the wireless device 50 is configured to operate in a wireless network and handle area update reports. The processing circuitry 52 is configured to initiate an RNAU, responsive to detecting that the wireless device has entered a cell not belonging to an RNA configured for the wireless device. The processing circuitry 52 is also configured to receive, from the wireless network, a message indicating that the wireless device's attempt to perform the RNAU has been rejected. The message includes or is accompanied by an indication that a wait time value is applicable. The processing circuitry 52 is also configured to, responsive to the message, set a reject wait timer to the wait time value and perform the RNAU upon expiry of the reject wait timer, by entering an RRC inactive state from an RRC connected state.

Figure 15:
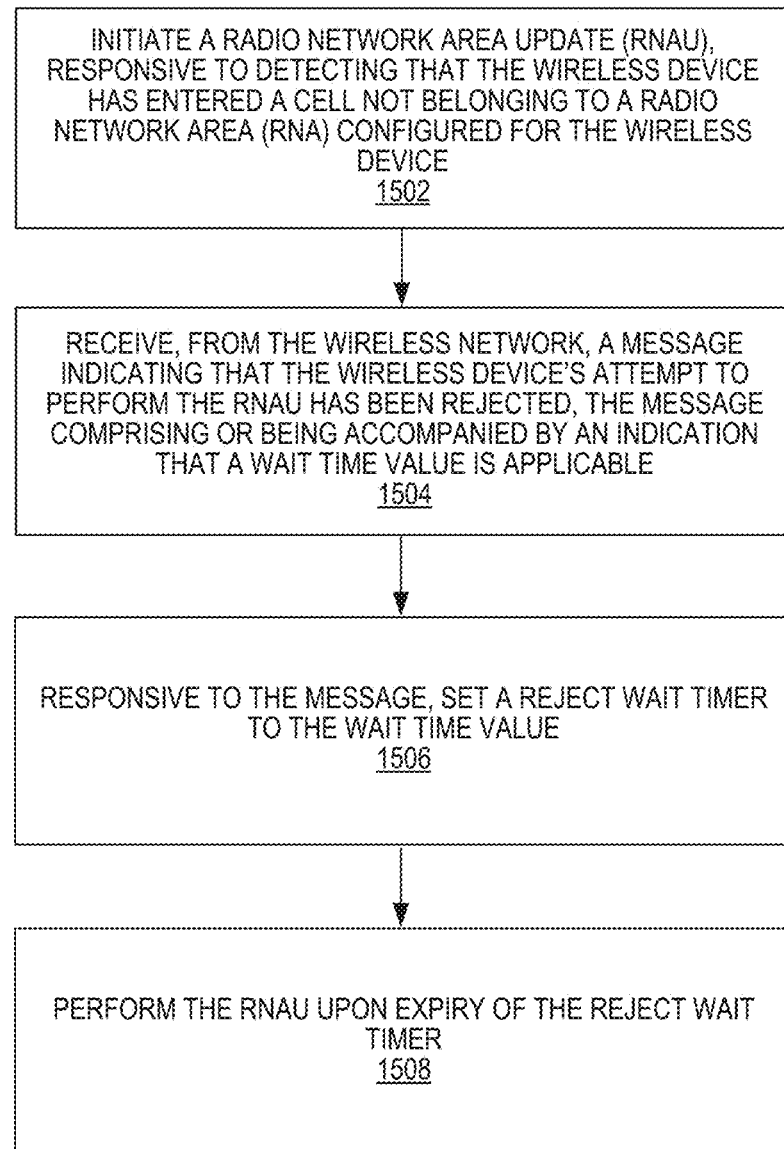
FIG. 15 is a process flow diagram illustrating an example method according to some embodiments, as carried out in the wireless device.

FIG. 15 is a process flow diagram illustrating a corresponding method 1500 implemented in the wireless device 50 for handling area update reports. The method 1500 includes initiating an RNAU, responsive to detecting that the wireless device has entered a cell not belonging to an RNA configured for the wireless device (block 1502). The method 500 includes receiving, from the wireless network, a message indicating that the wireless device's attempt to perform the RNAU has been rejected, the message comprising or being accompanied by an indication that a wait time value is applicable (block 1504). The method 500 also includes, responsive to the message, setting a reject wait timer to the wait time value (block 1506) and performing the RNAU upon expiry of the reject wait timer (block 1508). In some embodiments, the wireless device also sets a periodic RNAU timer to the wait time value, responsive to the message, and performs the RNAU upon expiry of the reject wait timer and the periodic RNAU timer.

In some embodiments, the wireless device is in a Radio Resource Connection (RRC) Inactive state and initiating the RNAU includes sending a request to resume an RRC connection. The message may include an RRC Resume Reject message or an RRC Release message.

In some embodiments, the reject wait timer is the T302 timer specified by the 3GPP and the periodic RNAU timer is the T380 timer specified by the 3GPP.

In some embodiments, the method further comprises tracking the RNAU as a pending notification while the reject wait timer is running In some embodiments, setting the periodic RNAU timer to the wait time value may be responsive to an indication in the message that the periodic RNAU timer is to be set to the wait time value. The wireless device may refrain from performing an RNAU update upon cell reselection prior to expiry of the reject wait timer.

According to some embodiments, the wireless device 50 is configured to perform another method for handling area update reports. In this case, the processing circuitry 52 is configured to initiate a combined RNAU and TAU, responsive to detecting that the wireless device has entered a cell not belonging to an RNA configured for the wireless device and not belonging to a tracking area configured for the wireless device. The processing circuitry 52 is also configured to receive, from the wireless network, a message indicating that the wireless device's attempt to perform the combined RNAU and TAU has been rejected, the message comprising or being accompanied by an indication that a wait time value is applicable. The processing circuitry 52 is configured to, responsive to the message, setting a reject wait timer to the wait time value and subsequently performing a cell reselection, prior to expiry of the reject wait timer. The processing circuitry 52 is configured to immediately perform a TAU, subsequent to the cell reselection.

Figure 16:
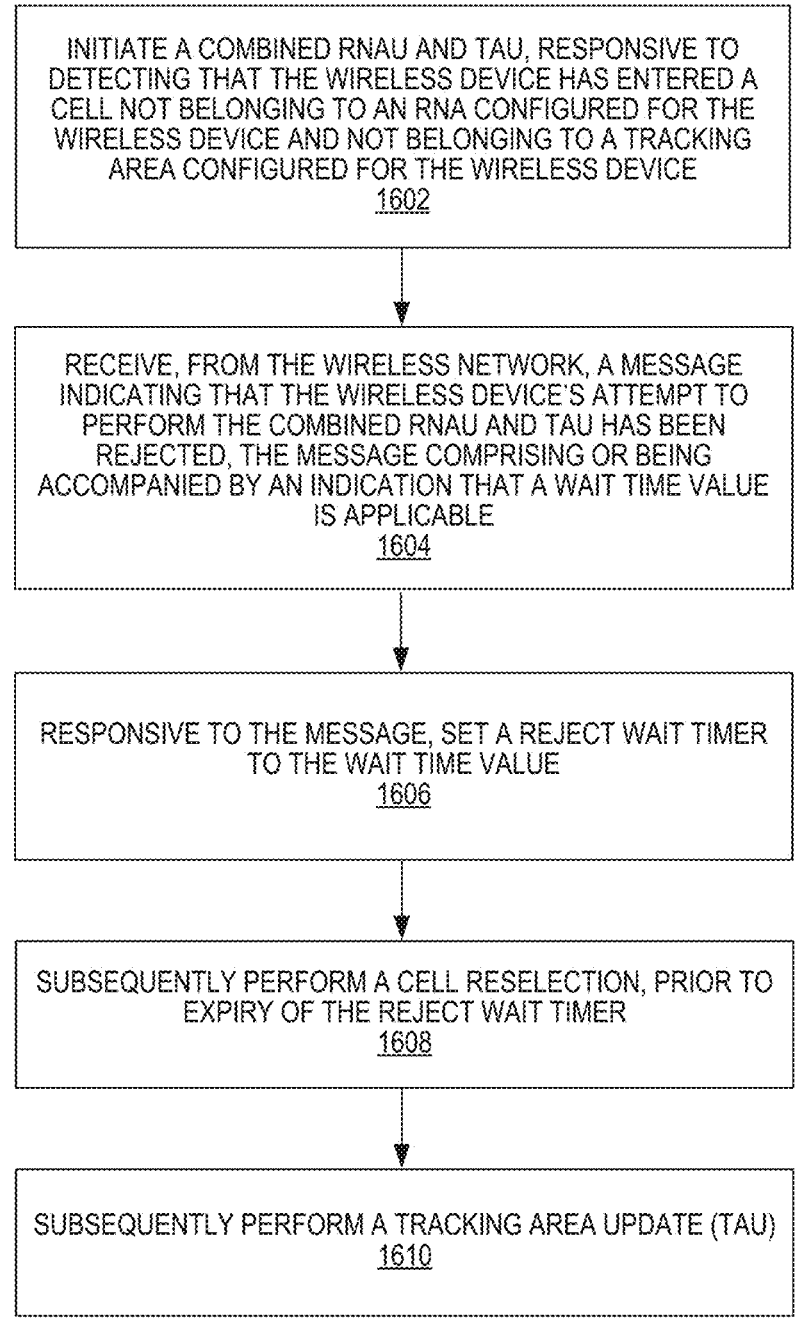
FIG. 16 is a process flow diagram illustrating another example method according to some embodiments, as carried out in the wireless device.

The processing circuitry 52 is also configured to perform a corresponding method 1600, according to some embodiments. The method 1600 shown in FIG. 16 includes entering initiating a combined RNAU and TAU, responsive to detecting that the wireless device has entered a cell not belonging to an RNA configured for the wireless device and not belonging to a tracking area configured for the wireless device (block 1602). The method 1600 includes receiving, from the wireless network, a message indicating that the wireless device's attempt to perform the combined RNAU and TAU has been rejected, the message comprising or being accompanied by an indication that a wait time value is applicable (block 1604). The method 1600 also includes, responsive to the message, setting a reject wait timer to the wait time value (block 1606). The method 1600 further includes subsequently performing a cell reselection, prior to expiry of the reject wait timer (block 1608) and immediately performing a TAU, subsequent to the cell reselection (block 1600).

According to some embodiments, the wireless device 50 is configured to perform another method for handling area update reports. In this case, the processing circuitry 52 is configured to initiate an RNAU, responsive to detecting that the wireless device has entered a cell not belonging to an RNA configured for the wireless device. The processing circuitry 52 is configured to receive, from the wireless network, a message indicating that the wireless device's attempt to perform the RNAU has been rejected, the message comprising or being accompanied by an indication that a wait time value is applicable. The processing circuitry 52 is further configured to, responsive to the message, set a reject wait timer to the wait time value, and notifying the wireless device's RRC layer of the rejection. In some embodiments, the processing circuitry 52 is further configured to, responsive to the message, set a periodic RNAU timer to a default value.

Figure 17:
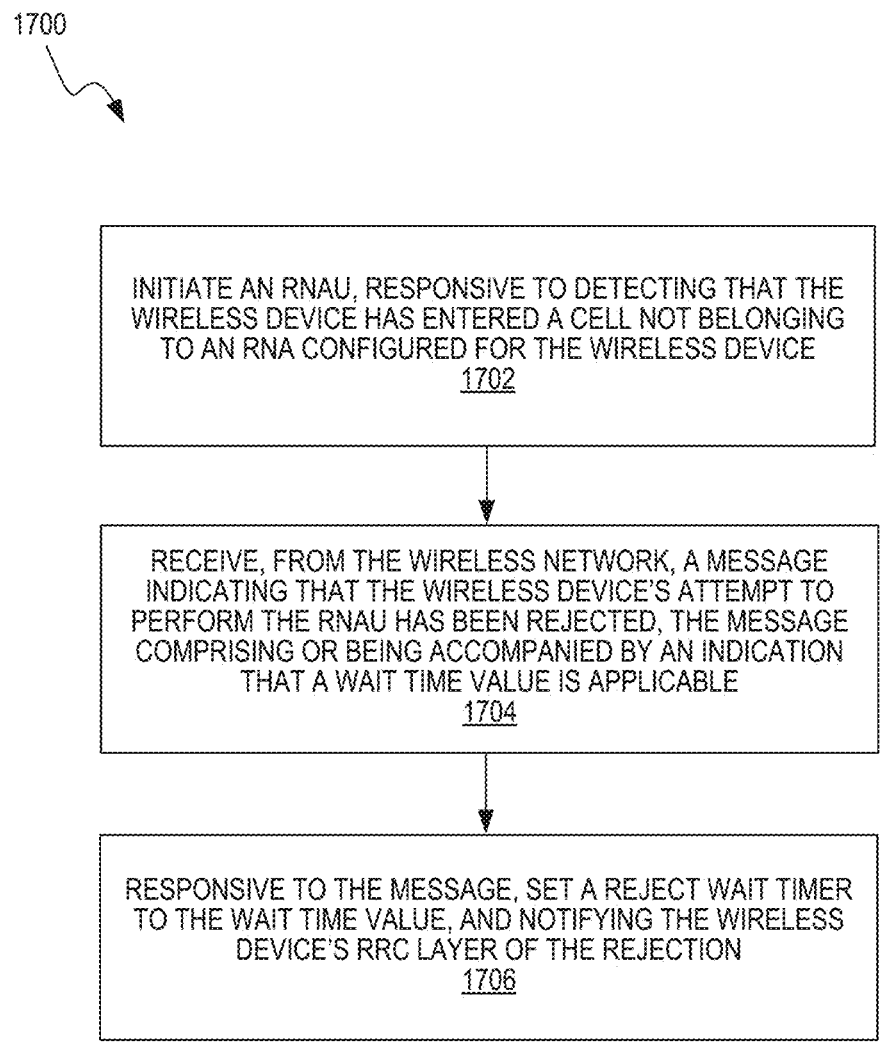
FIG. 17 is a process flow diagram illustrating another example method according to some embodiments, as carried out in the wireless device.

The processing circuitry 52 is also configured to perform a corresponding method 1700, according to some embodiments. The method 1700 shown in FIG. 17 includes initiating an RNAU, responsive to detecting that the wireless device has entered a cell not belonging to an RNA configured for the wireless device (block 1702). The method 1700 also includes receiving, from the wireless network, a message indicating that the wireless device's attempt to perform the RNAU has been rejected, the message comprising or being accompanied by an indication that a wait time value is applicable (block 1704). The method 1700 further includes, responsive to the message, setting a reject wait timer to the wait time value, and notifying the wireless device's RRC layer of the rejection (block 1706). In some embodiments, the method further comprises, responsive to the message, setting a periodic RNAU timer to a default value.

According to some embodiments, the wireless device 50 is configured to perform yet another method for handling area update reports. In this case, the processing circuitry 52 is configured to initiate an RNAU, responsive to detecting that the wireless device has entered a cell not belonging to an RNA configured for the wireless device. The processing circuitry 52 is also configured to receive, from the wireless network, a message indicating that the wireless device's attempt to perform the RNAU has been rejected, the message comprising or being accompanied by an indication that a wait time value is applicable. The processing circuitry 52 is configured to, responsive to the message, track the rejected RNAU as a pending notification, such that the rejected RNAU is attempted again as soon as allowed and/or as soon as certain conditions are met.

Figure 18:
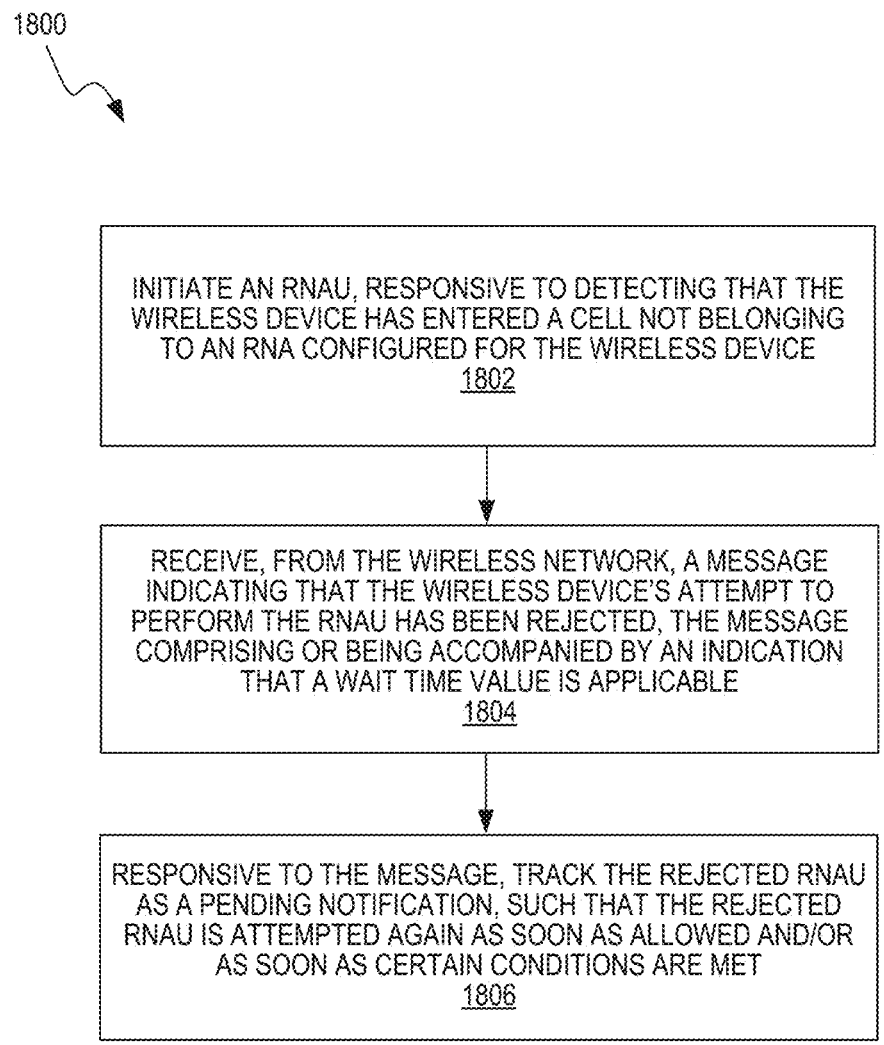
FIG. 18 is a process flow diagram illustrating another example method according to some embodiments, as carried out in the wireless device.

The processing circuitry 52 is also configured to perform a corresponding method 1800, according to some embodiments. The method 1800 shown in FIG. 18 includes initiating an RNAU, responsive to detecting that the wireless device has entered a cell not belonging to an RNA configured for the wireless device (block 1802). The method 1800 also includes receiving, from the wireless network, a message indicating that the wireless device's attempt to perform the RNAU has been rejected, the message comprising or being accompanied by an indication that a wait time value is applicable (block 1804). The method 1800 further includes, responsive to the message, tracking the rejected RNAU as a pending notification, such that the rejected RNAU is attempted again as soon as allowed and/or as soon as certain conditions are met (block 1806).

The method 1800 may further include attempting the rejected RNAU again responsive to a reject waiter timer expiring. Attempting the rejected RNAU may be further responsive to determining that the wireless device is still camping on a cell outside the RNA configured for the wireless device, when the reject wait timer expires. Attempting the rejected RNAU may also be further responsive to determining that the rejected RNAU is a combined RNAU and TAU.

In some embodiments, the method 1800 may include attempting the rejected RNAU again responsive to a cell reselection. Attempting the rejected RNAU may be further responsive to determining that the cell reselection is to a cell that is not in the RNAU configured for the wireless device. Attempting the rejected RNAU may be further responsive to determining that the rejected RNAU is a combined RNAU and TAU.

In some embodiments, attempting the rejected RNAU again includes sending a request to resume an RRC connection to the wireless network, the request to resume an RRC connection indicating that the Resume RRC Connection message corresponds to a pending notification.

In other embodiments, the wireless device is in an RRC Inactive state, and initiating the RNAU comprises sending a request to resume an RRC connection. The message may include an RRC Resume Reject message or an RRC Release message.

The method 1800 may include continuing to monitor radio access network (RAN) paging according to a stored configuration, subsequent to receiving the message. The method 1800 may also include monitoring only core network (CN) paging, subsequent to receiving the message.

As discussed in detail above, the techniques described herein, e.g., as illustrated in the process flow diagrams of FIGS. 15-18, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 19:
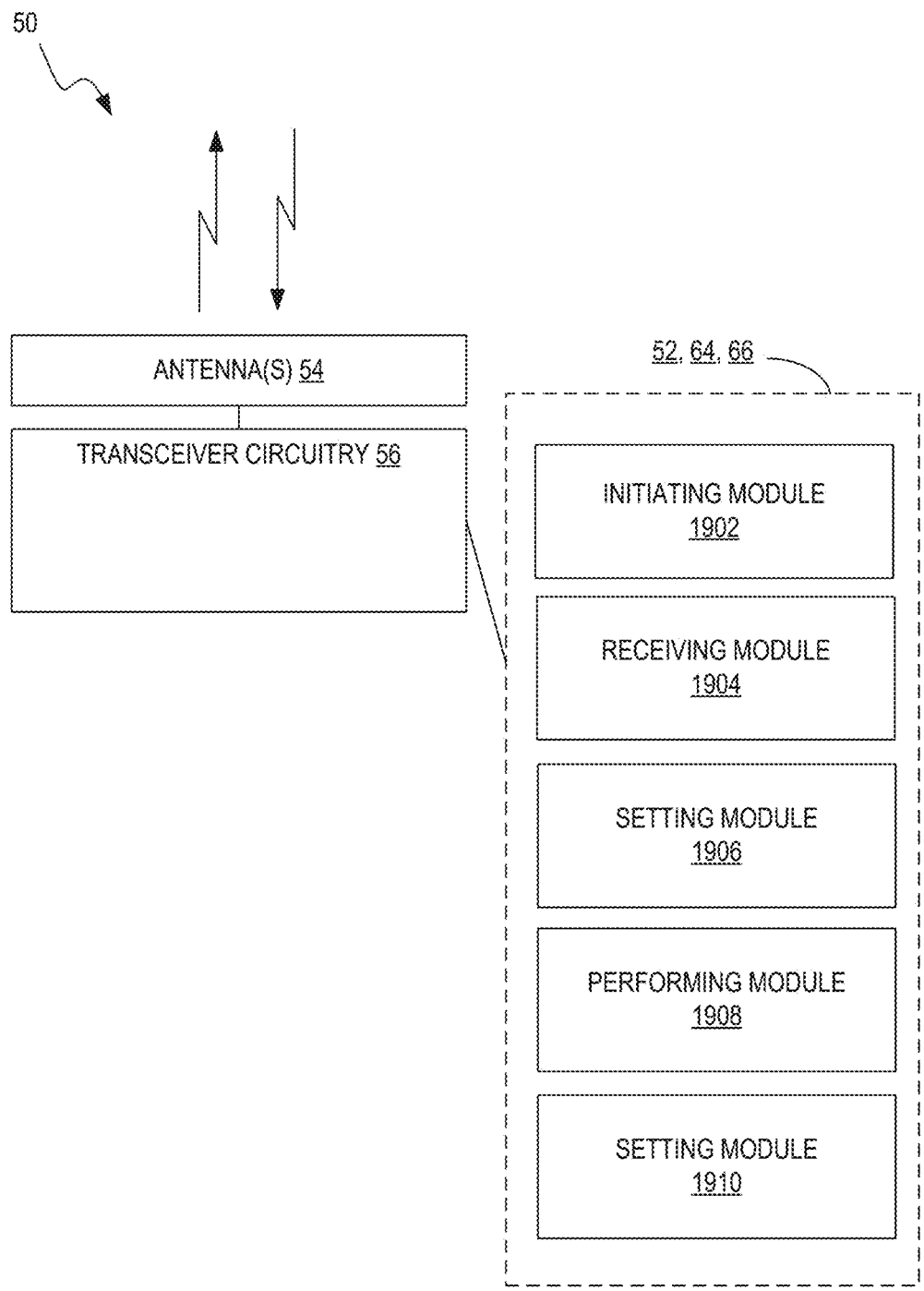
FIG. 19 is a block diagram illustrating a functional representation of an example wireless device.

FIG. 19 illustrates an example functional module or circuit architecture as may be implemented in a wireless device 50. The implementation includes an initiating module 1902 for initiating an RNAU, responsive to detecting that the wireless device has entered a cell not belonging to an RNA configured for the wireless device. The implementation also includes a receiving module 1904 for receiving, from the wireless network, a message indicating that the wireless device's attempt to perform the RNAU has been rejected, the message comprising or being accompanied by an indication that a wait time value is applicable. The implementation also includes a setting module 1906 for, responsive to the message, setting both a reject wait timer and a periodic RNAU timer to the wait time value and a performing module 1908 for performing the RNAU upon expiry of the reject wait timer and the periodic RNAU timer.

In another example implementation, the initiating module 1902 is for initiating a combined RNAU and TAU, responsive to detecting that the wireless device has entered a cell not belonging to an RNA configured for the wireless device and not belonging to a tracking area configured for the wireless device. The receiving module 1904 is for receiving, from the wireless network, a message indicating that the wireless device's attempt to perform the combined RNAU and TAU has been rejected, the message comprising or being accompanied by an indication that a wait time value is applicable. The setting module 1906 is for, responsive to the message, setting a reject wait timer to the wait time value and re-starting a periodic RNAU timer. The performing module 1908 is for subsequently performing a cell reselection, prior to expiry of the periodic RNAU timer and immediately performing a TAU, subsequent to the cell reselection.

In another example implementation, the initiating module 1902 is for initiating an RNAU, responsive to detecting that the wireless device has entered a cell not belonging to an RNA configured for the wireless device, and the receiving module 1904 is for receiving, from the wireless network, a message indicating that the wireless device's attempt to perform the RNAU has been rejected, the message comprising or being accompanied by an indication that a wait time value is applicable. The setting module 1906 is for, responsive to the message, setting a reject wait timer to the wait time value, setting a periodic RNAU timer to a default value, and notifying the wireless device's RRC layer of the rejection.

In another example implementation, the initiating module 1902 is for initiating an RNAU, responsive to detecting that the wireless device has entered a cell not belonging to an RNA configured for the wireless device. The receiving module 1904 is for receiving, from the wireless network, a message indicating that the wireless device's attempt to perform the RNAU has been rejected, the message comprising or being accompanied by an indication that a wait time value is applicable. The implementation may also include a tracking module 1910 for, responsive to the message, tracking the rejected RNAU as a pending notification, such that the rejected RNAU is attempted again as soon as allowed and/or as soon as certain conditions are met.

EXAMPLE EMBODIMENTS

Example embodiments of the techniques and apparatus described herein include, but are not limited to, the following enumerated examples:

(a). A method, in a wireless device operating in a wireless network, for handling area update reports, the method comprising:
  initiating a radio network area update (RNAU), responsive to detecting that the wireless device has entered a cell not belonging to a radio network area (RNA) configured for the wireless device;
  receiving, from the wireless network, a message indicating that the wireless device's attempt to perform the RNAU has been rejected, the message comprising or being accompanied by an indication that a wait time value is applicable;
  responsive to the message, setting both a reject wait timer and a periodic RNAU timer to the wait time value; and
  performing the RNAU upon expiry of the reject wait timer and the periodic RNAU timer.

(b). The method of example embodiment (a), wherein the wireless device is in a Radio Resource Connection (RRC) Inactive state, and wherein initiating the RNAU comprises sending a request to resume an RRC connection.

(c). The method of example embodiment (b), wherein the message comprises an RRC Resume Reject message or an RRC Release message.

(d). The method of any of example embodiments (a)-(c), wherein the reject wait timer is the T302 timer specified by the $3^{rd}$-Generation Partnership Project (3GPP) and the periodic RNAU timer is the T380 timer specified by the 3GPP.

(e). The method of any of example embodiments (a)-(d), wherein said setting the periodic RNAU timer to the wait time value is responsive to an indication in the message that the periodic RNAU timer is to be set to the wait time value.

(f). The method of any of example embodiments (a)-(e), wherein the wireless device refrains from performing an RNAU update upon cell reselection prior to expiry of the reject wait timer.

(g). A method, in a wireless device operating in a wireless network, for handling area update reports, the method comprising:
  initiating a combined radio network area update (RNAU) and tracking area update (TAU), responsive to detecting that the wireless device has entered a cell not belonging to a radio network area (RNA) configured for the wireless device and not belonging to a tracking area configured for the wireless device;
  receiving, from the wireless network, a message indicating that the wireless device's attempt to perform the combined RNAU and TAU has been rejected, the message comprising or being accompanied by an indication that a wait time value is applicable;
  responsive to the message, setting a reject wait timer to the wait time value and re-starting a periodic RNAU timer;
  subsequently performing a cell reselection, prior to expiry of the periodic RNAU timer; and
  immediately performing a TAU, subsequent to the cell reselection.

(h). A method, in a wireless device operating in a wireless network, for handling area update reports, the method comprising:
  initiating a radio network area update (RNAU), responsive to detecting that the wireless device has entered a cell not belonging to a radio network area (RNA) configured for the wireless device;
  receiving, from the wireless network, a message indicating that the wireless device's attempt to perform the RNAU has been rejected, the message comprising or being accompanied by an indication that a wait time value is applicable;
  responsive to the message, setting a reject wait timer to the wait time value, setting a periodic RNAU timer to a default value, and notifying the wireless device's RRC layer of the rejection.

(i). A method, in a wireless device operating in a wireless network, for handling area update reports, the method comprising:
  initiating a radio network area update (RNAU), responsive to detecting that the wireless device has entered a cell not belonging to a radio network area (RNA) configured for the wireless device;
  receiving, from the wireless network, a message indicating that the wireless device's attempt to perform the RNAU has been rejected, the message comprising or being accompanied by an indication that a wait time value is applicable;
  responsive to the message, tracking the rejected RNAU as a pending notification, such that the rejected RNAU is attempted again as soon as allowed and/or as soon as certain conditions are met.

(j). The method of example embodiment (i), further comprising attempting the rejected RNAU again responsive to a reject waiter timer expiring.

(k). The method of example embodiment (j), wherein said attempting the rejected RNAU is further responsive to determining that the wireless device is still camping on a cell outside the RNA configured for the wireless device, when the reject wait timer expires.

(l). The method of example embodiment (j) or (k), wherein said attempting the rejected RNAU is further responsive to determining that the rejected RNAU is a combined RNAU and tracking area update (TAU).

(m). The method of example embodiment (i), further comprising attempting the rejected RNAU again responsive to a cell reselection.

(n). The method of example embodiment (m), wherein said attempting the rejected RNAU is further responsive to determining that the cell reselection is to a cell that is not in the RNAU configured for the wireless device.

(o). The method of example embodiment (m) or (n), wherein said attempting the rejected RNAU is further responsive to determining that the rejected RNAU is a combined RNAU and tracking area update (TAU).

(p). The method of any of example embodiments (j)-(o), wherein said attempting the rejected RNAU again comprises sending a request to resume an RRC connection to the wireless network, the request to resume an RRC connection indicating that the Resume RRC Connection message corresponds to a pending notification.

(q). The method of any of example embodiments (i)-(p), wherein the wireless device is in a Radio Resource Connection (RRC) Inactive state, and wherein initiating the RNAU comprises sending a request to resume an RRC connection.

(r). The method of example embodiment (q), wherein the message comprises an RRC Resume Reject message or an RRC Release message.

(s). The method of any of example embodiments (a)-(q), further comprising continuing to monitor radio access network (RAN) paging according to a stored configuration, subsequent to receiving the message.

(t). The method of any of example embodiments (a)-(q), further comprising monitoring only core network (CN) paging, subsequent to receiving the message.

(u). A wireless device adapted to perform the methods of any of example embodiments (a)-(t).

(v). A wireless device comprising transceiver circuitry and processing circuitry operatively associated with the transceiver circuitry and configured to perform the methods of any of example embodiments (a)-(t).

(w). A computer program comprising instructions that, when executed on at least one processing circuit, cause the at least one processing circuit to carry out the method according to any one of example embodiments (a)-(t).

(x). A carrier containing the computer program of example embodiment (v), wherein the carrier is one of an electronic signal, optical signal, radio signal, or computer readable storage medium.

(y). A communication system including a host computer comprising:
  processing circuitry configured to provide user data; and
  a communication interface configured to forward user data to a cellular network for transmission to a user equipment (UE) operating in a wireless network, wherein the UE comprises a radio interface and processing circuitry, the UE's processing circuitry configured to:
    initiate a radio network area update (RNAU), responsive to detecting that the UE has entered a cell not belonging to a radio network area (RNA) configured for the UE;
    receive, from the wireless network, a message indicating that the UE's attempt to perform the RNAU has been rejected, the message comprising or being accompanied by an indication that a wait time value is applicable;
    responsive to the message, set both a reject wait timer and a periodic RNAU timer to the wait time value; and
    perform the RNAU upon expiry of the reject wait timer and the periodic RNAU timer.

(z). A communication system including a host computer comprising:
  processing circuitry configured to provide user data; and
  a communication interface configured to forward user data to a cellular network for transmission to a user equipment (UE) operating in a wireless network, wherein the UE comprises a radio interface and processing circuitry, the UE's processing circuitry configured to:
    initiate a combined radio network area update (RNAU) and tracking area update (TAU), responsive to detecting that the UE has entered a cell not belonging to a radio network area (RNA) configured for the UE and not belonging to a tracking area configured for the UE;
    receive, from the wireless network, a message indicating that the UE's attempt to perform the combined RNAU and TAU has been rejected, the message comprising or being accompanied by an indication that a wait time value is applicable;
    responsive to the message, set a reject wait timer to the wait time value and re-starting a periodic RNAU timer;
    subsequently perform a cell reselection, prior to expiry of the periodic RNAU timer; and
    immediately perform a TAU, subsequent to the cell reselection.

(aa). A communication system including a host computer comprising:
  processing circuitry configured to provide user data; and
  a communication interface configured to forward user data to a cellular network for transmission to a user equipment (UE) operating in a wireless network, wherein the UE comprises a radio interface and processing circuitry, the UE's processing circuitry configured to:
    initiate a radio network area update (RNAU), responsive to detecting that the UE has entered a cell not belonging to a radio network area (RNA) configured for the UE;
    receive, from the wireless network, a message indicating that the UE's attempt to perform the RNAU has been rejected, the message comprising or being accompanied by an indication that a wait time value is applicable;
    responsive to the message, set a reject wait timer to the wait time value, setting a periodic RNAU timer to a default value, and notifying the UE's RRC layer of the rejection.

(bb). A communication system including a host computer comprising:
  processing circuitry configured to provide user data; and
  a communication interface configured to forward user data to a cellular network for transmission to a user equipment (UE) operating in a wireless network, wherein the UE comprises a radio interface and processing circuitry, the UE's processing circuitry configured to:
    initiate a radio network area update (RNAU), responsive to detecting that the UE has entered a cell not belonging to a radio network area (RNA) configured for the UE;
    receive, from the wireless network, a message indicating that the UE's attempt to perform the RNAU has been rejected, the message comprising or being accompanied by an indication that a wait time value is applicable;
    responsive to the message, track the rejected RNAU as a pending notification, such that the rejected RNAU is attempted again as soon as allowed and/or as soon as certain conditions are met (cc). The communication system of any of example embodiments (y)-(bb), further including the UE.

(dd). The communication system of any of example embodiments (y)-(cc), wherein the cellular network further includes a base station configured to communicate with the UE.

(ee). The communication system of any of example embodiments (y)-(dd), wherein:
the processing circuitry of the host computer is configured to execute a host application, thereby providing the user data; and
the UE's processing circuitry is configured to execute a client application associated with the host application.

(ff). A method implemented in a communication system including a host computer, a base station and a user equipment (UE), the method comprising:
at the host computer, providing user data; and
at the host computer, initiating a transmission carrying the user data to the UE via a wireless network comprising the base station, wherein the method at the UE comprises:
initiating a radio network area update (RNAU), responsive to detecting that the UE has entered a cell not belonging to a radio network area (RNA) configured for the UE;
receiving, from the wireless network, a message indicating that the UE's attempt to perform the RNAU has been rejected, the message comprising or being accompanied by an indication that a wait time value is applicable;
responsive to the message, setting both a reject wait timer and a periodic RNAU timer to the wait time value; and
performing the RNAU upon expiry of the reject wait timer and the periodic RNAU timer.

(gg). A method implemented in a communication system including a host computer, a base station and a user equipment (UE), the method comprising:
at the host computer, providing user data; and
at the host computer, initiating a transmission carrying the user data to the UE via a wireless network comprising the base station, wherein the method at the UE comprises:
initiating a combined radio network area update (RNAU) and tracking area update (TAU), responsive to detecting that the UE has entered a cell not belonging to a radio network area (RNA) configured for the UE and not belonging to a tracking area configured for the UE;
receiving, from the wireless network, a message indicating that the UE's attempt to perform the combined RNAU and TAU has been rejected, the message comprising or being accompanied by an indication that a wait time value is applicable;
responsive to the message, setting a reject wait timer to the wait time value and re-starting a periodic RNAU timer;
subsequently performing a cell reselection, prior to expiry of the periodic RNAU timer; and
immediately performing a TAU, subsequent to the cell reselection.

(hh). A method implemented in a communication system including a host computer, a base station and a user equipment (UE), the method comprising:
at the host computer, providing user data; and
at the host computer, initiating a transmission carrying the user data to the UE via a wireless network comprising the base station, wherein the method at the UE comprises:
initiating a radio network area update (RNAU), responsive to detecting that the UE has entered a cell not belonging to a radio network area (RNA) configured for the UE;
receiving, from the wireless network, a message indicating that the UE's attempt to perform the RNAU has been rejected, the message comprising or being accompanied by an indication that a wait time value is applicable;
responsive to the message, setting a reject wait timer to the wait time value, setting a periodic RNAU timer to a default value, and notifying the UE's RRC layer of the rejection.

(ii). A method implemented in a communication system including a host computer, a base station and a user equipment (UE), the method comprising:
at the host computer, providing user data; and
at the host computer, initiating a transmission carrying the user data to the UE via a wireless network comprising the base station, wherein the method at the UE comprises:
initiating a radio network area update (RNAU), responsive to detecting that the UE has entered a cell not belonging to a radio network area (RNA) configured for the UE;
receiving, from the wireless network, a message indicating that the UE's attempt to perform the RNAU has been rejected, the message comprising or being accompanied by an indication that a wait time value is applicable;
responsive to the message, tracking the rejected RNAU as a pending notification, such that the rejected RNAU is attempted again as soon as allowed and/or as soon as certain conditions are met.

(jj). The method of any of example embodiments (y)-(bb), further comprising:
at the UE, receiving the user data from the base station.

(kk). A communication system including a host computer comprising:
a communication interface configured to receive user data originating from a transmission from a user equipment (UE) operating in a wireless network to a base station, the UE's processing circuitry configured to:
initiate a radio network area update (RNAU), responsive to detecting that the UE has entered a cell not belonging to a radio network area (RNA) configured for the UE;
receive, from the wireless network, a message indicating that the UE's attempt to perform the RNAU has been rejected, the message comprising or being accompanied by an indication that a wait time value is applicable;
responsive to the message, set both a reject wait timer and a periodic RNAU timer to the wait time value; and
perform the RNAU upon expiry of the reject wait timer and the periodic RNAU timer.

(ll). A communication system including a host computer comprising:
a communication interface configured to receive user data originating from a transmission from a user equipment (UE) operating in a wireless network to a base station, the UE's processing circuitry configured to:
initiate a combined radio network area update (RNAU) and tracking area update (TAU), responsive to detecting that the UE has entered a cell not belonging to a radio network area (RNA) configured for the UE and not belonging to a tracking area configured for the UE;
receive, from the wireless network, a message indicating that the UE's attempt to perform the combined RNAU and TAU has been rejected, the message comprising or being accompanied by an indication that a wait time value is applicable;

responsive to the message, set a reject wait timer to the wait time value and re-starting a periodic RNAU timer;

subsequently perform a cell reselection, prior to expiry of the periodic RNAU timer; and immediately perform a TAU, subsequent to the cell reselection.

(mm). A communication system including a host computer comprising:

a communication interface configured to receive user data originating from a transmission from a user equipment (UE) operating in a wireless network to a base station, the UE's processing circuitry configured to:

initiate a radio network area update (RNAU), responsive to detecting that the UE has entered a cell not belonging to a radio network area (RNA) configured for the UE;

receive, from the wireless network, a message indicating that the UE's attempt to perform the RNAU has been rejected, the message comprising or being accompanied by an indication that a wait time value is applicable;

responsive to the message, set a reject wait timer to the wait time value, setting a periodic RNAU timer to a default value, and notifying the UE's RRC layer of the rejection.

(nn). A communication system including a host computer comprising:

a communication interface configured to receive user data originating from a transmission from a user equipment (UE) operating in a wireless network to a base station, the UE's processing circuitry configured to:

initiate a radio network area update (RNAU), responsive to detecting that the UE has entered a cell not belonging to a radio network area (RNA) configured for the UE;

receive, from the wireless network, a message indicating that the UE's attempt to perform the RNAU has been rejected, the message comprising or being accompanied by an indication that a wait time value is applicable;

responsive to the message, track the rejected RNAU as a pending notification, such that the rejected RNAU is attempted again as soon as allowed and/or as soon as certain conditions are met.

(oo). The communication system of any of example embodiments (kk)-(nn), further including the UE.

(pp). The communication system of any of example embodiment (kk)-(oo), further including the base station, wherein the base station comprises a radio interface configured to communicate with the UE and a communication interface configured to forward to the host computer the user data carried by a transmission from the UE to the base station.

(qq). The communication system of any of example embodiments (kk)-(oo), wherein:

the processing circuitry of the host computer is configured to execute a host application; and the UE's processing circuitry is configured to execute a client application associated with the host application, thereby providing the user data.

(rr). The communication system of any of example embodiments (kk)-(oo), wherein:

the processing circuitry of the host computer is configured to execute a host application, thereby providing request data; and the UE's processing circuitry is configured to execute a client application associated with the host application, thereby providing the user data in response to the request data.

(ss). A method implemented in a user equipment (UE), comprising:

initiating a radio network area update (RNAU), responsive to detecting that the UE has entered a cell not belonging to a radio network area (RNA) configured for the UE;

receiving, from the wireless network, a message indicating that the UE's attempt to perform the RNAU has been rejected, the message comprising or being accompanied by an indication that a wait time value is applicable;

responsive to the message, setting both a reject wait timer and a periodic RNAU timer to the wait time value; and performing the RNAU upon expiry of the reject wait timer and the periodic RNAU timer.

(tt). A method implemented in a user equipment (UE) operating in a wireless network, comprising:

initiating a combined radio network area update (RNAU) and tracking area update (TAU), responsive to detecting that the UE has entered a cell not belonging to a radio network area (RNA) configured for the UE and not belonging to a tracking area configured for the UE;

receiving, from the wireless network, a message indicating that the UE's attempt to perform the combined RNAU and TAU has been rejected, the message comprising or being accompanied by an indication that a wait time value is applicable;

responsive to the message, setting a reject wait timer to the wait time value and re-starting a periodic RNAU timer;

subsequently performing a cell reselection, prior to expiry of the periodic RNAU timer; and immediately performing a TAU, subsequent to the cell reselection.

(uu). A method implemented in a user equipment (UE) operating in a wireless network, comprising:

initiating a radio network area update (RNAU), responsive to detecting that the UE has entered a cell not belonging to a radio network area (RNA) configured for the UE;

receiving, from the wireless network, a message indicating that the UE's attempt to perform the RNAU has been rejected, the message comprising or being accompanied by an indication that a wait time value is applicable;

responsive to the message, setting a reject wait timer to the wait time value, setting a periodic RNAU timer to a default value, and notifying the UE's RRC layer of the rejection.

(vv). A method implemented in a user equipment (UE) operating in a wireless network, comprising:

initiating a radio network area update (RNAU), responsive to detecting that the UE has entered a cell not belonging to a radio network area (RNA) configured for the UE;

receiving, from the wireless network, a message indicating that the UE's attempt to perform the RNAU has been rejected, the message comprising or being accompanied by an indication that a wait time value is applicable;
responsive to the message, tracking the rejected RNAU as a pending notification, such that the rejected RNAU is attempted again as soon as allowed and/or as soon as certain conditions are met.

(ww). The method of any of example embodiments (ss)-(vv), further comprising:
providing user data; and
forwarding the user data to a host computer via the transmission to the base station.

(xx). A method implemented in a communication system including a host computer, a base station and a user equipment (UE) operating in a wireless network, the method comprising:
at the host computer, receiving user data transmitted to the base station from the UE, wherein the method comprises, at the UE:
initiating a radio network area update (RNAU), responsive to detecting that the UE has entered a cell not belonging to a radio network area (RNA) configured for the UE;
receiving, from the wireless network, a message indicating that the UE's attempt to perform the RNAU has been rejected, the message comprising or being accompanied by an indication that a wait time value is applicable;
responsive to the message, setting both a reject wait timer and a periodic RNAU timer to the wait time value; and
performing the RNAU upon expiry of the reject wait timer and the periodic RNAU timer.

(yy). A method implemented in a communication system including a host computer, a base station and a user equipment (UE) operating in a wireless network, the method comprising:
at the host computer, receiving user data transmitted to the base station from the UE, wherein the method comprises, at the UE:
initiating a combined radio network area update (RNAU) and tracking area update (TAU), responsive to detecting that the UE has entered a cell not belonging to a radio network area (RNA) configured for the UE and not belonging to a tracking area configured for the UE;
receiving, from the wireless network, a message indicating that the UE's attempt to perform the combined RNAU and TAU has been rejected, the message comprising or being accompanied by an indication that a wait time value is applicable;
responsive to the message, setting a reject wait timer to the wait time value and re-starting a periodic RNAU timer;
subsequently performing a cell reselection, prior to expiry of the periodic RNAU timer; and
immediately performing a TAU, subsequent to the cell reselection.

(zz). A method implemented in a communication system including a host computer, a base station and a user equipment (UE) operating in a wireless network, the method comprising:
at the host computer, receiving user data transmitted to the base station from the UE, wherein the method comprises, at the UE:
initiating a radio network area update (RNAU), responsive to detecting that the UE has entered a cell not belonging to a radio network area (RNA) configured for the UE;
receiving, from the wireless network, a message indicating that the UE's attempt to perform the RNAU has been rejected, the message comprising or being accompanied by an indication that a wait time value is applicable;
responsive to the message, setting a reject wait timer to the wait time value, setting a periodic RNAU timer to a default value, and notifying the UE's RRC layer of the rejection.

(aaa). A method implemented in a communication system including a host computer, a base station and a user equipment (UE) operating in a wireless network, the method comprising:
at the host computer, receiving user data transmitted to the base station from the UE, wherein the method comprises, at the UE:
initiating a radio network area update (RNAU), responsive to detecting that the UE has entered a cell not belonging to a radio network area (RNA) configured for the UE;
receiving, from the wireless network, a message indicating that the UE's attempt to perform the RNAU has been rejected, the message comprising or being accompanied by an indication that a wait time value is applicable;
responsive to the message, tracking the rejected RNAU as a pending notification, such that the rejected RNAU is attempted again as soon as allowed and/or as soon as certain conditions are met.

(bbb). The method of any of example embodiments (xx)-(aaa), further comprising:
at the UE, providing the user data to the base station.

(ccc). The method of any of example embodiments (xx)-(aaa), further comprising:
at the UE, executing a client application, thereby providing the user data to be transmitted; and
at the host computer, executing a host application associated with the client application.

(ddd). The method of any of example embodiments (xx)-(aaa), further comprising:
at the UE, executing a client application; and
at the UE, receiving input data to the client application, the input data being provided at the host computer by executing a host application associated with the client application,
wherein the user data to be transmitted is provided by the client application in response to the input data.

(eee). A communication system including a host computer comprising:
a communication interface configured to receive user data originating from a transmission from a user equipment (UE) operating in a wireless network to a base station, the UE's processing circuitry configured to:
initiate a radio network area update (RNAU), responsive to detecting that the UE has entered a cell not belonging to a radio network area (RNA) configured for the UE;
receive, from the wireless network, a message indicating that the UE's attempt to perform the RNAU has been rejected, the message comprising or being accompanied by an indication that a wait time value is applicable;

responsive to the message, set both a reject wait timer and a periodic RNAU timer to the wait time value; and perform the RNAU upon expiry of the reject wait timer and the periodic RNAU timer.

(fff). A communication system including a host computer comprising:
a communication interface configured to receive user data originating from a transmission from a user equipment (UE) operating in a wireless network to a base station, the UE's processing circuitry configured to:
initiate a combined radio network area update (RNAU) and tracking area update (TAU), responsive to detecting that the UE has entered a cell not belonging to a radio network area (RNA) configured for the UE and not belonging to a tracking area configured for the UE;
receive, from the wireless network, a message indicating that the UE's attempt to perform the combined RNAU and TAU has been rejected, the message comprising or being accompanied by an indication that a wait time value is applicable;
responsive to the message, set a reject wait timer to the wait time value and re-starting a periodic RNAU timer;
subsequently perform a cell reselection, prior to expiry of the periodic RNAU timer; and
immediately perform a TAU, subsequent to the cell reselection.

(ggg). A communication system including a host computer comprising:
a communication interface configured to receive user data originating from a transmission from a user equipment (UE) operating in a wireless network to a base station, the UE's processing circuitry configured to:
initiate a radio network area update (RNAU), responsive to detecting that the UE has entered a cell not belonging to a radio network area (RNA) configured for the UE;
receive, from the wireless network, a message indicating that the UE's attempt to perform the RNAU has been rejected, the message comprising or being accompanied by an indication that a wait time value is applicable;
responsive to the message, set a reject wait timer to the wait time value, setting a periodic RNAU timer to a default value, and notifying the UE's RRC layer of the rejection.

(hhh). A communication system including a host computer comprising:
a communication interface configured to receive user data originating from a transmission from a user equipment (UE) operating in a wireless network to a base station, the UE's processing circuitry configured to:
initiate a radio network area update (RNAU), responsive to detecting that the UE has entered a cell not belonging to a radio network area (RNA) configured for the UE;
receive, from the wireless network, a message indicating that the UE's attempt to perform the RNAU has been rejected, the message comprising or being accompanied by an indication that a wait time value is applicable;
responsive to the message, track the rejected RNAU as a pending notification, such that the rejected RNAU is attempted again as soon as allowed and/or as soon as certain conditions are met.

(iii). The communication system of any of example embodiments (eee)-(hhh), further including the UE.

(jjj). The communication system of any of example embodiments (eee)-(hhh), further including the base station, wherein the base station comprises a radio interface configured to communicate with the UE and a communication interface configured to forward to the host computer the user data carried by a transmission from the UE to the base station.

(kkk). The communication system of any of example embodiments (eee)-(hhh), wherein:
the processing circuitry of the host computer is configured to execute a host application; and
the UE's processing circuitry is configured to execute a client application associated with the host application, thereby providing the user data.

(lll). The communication system of any of example embodiments (eee)-(hhh), wherein:
the processing circuitry of the host computer is configured to execute a host application, thereby providing request data; and
the UE's processing circuitry is configured to execute a client application associated with the host application, thereby providing the user data in response to the request data.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in wireless network comprising a wireless device and a base station, the method comprising:
initiating, by the wireless device, a radio network area update (RNAU), responsive to detecting that the wireless device has entered a cell not belonging to a radio network area (RNA) configured for the wireless device;
transmitting, by the base station, a message indicating that the wireless device's attempt to perform the RNAU has been rejected, the message comprising or being accompanied by an indication that a wait time value is applicable;
receiving, by the wireless device, the message indicating that the wireless device's attempt to perform the RNAU has been rejected;
responsive to the message, setting, by the wireless device, a reject wait timer to the wait time value; and
performing, by the wireless device, the RNAU, upon expiry of the reject wait timer.

2. The method of claim 1, wherein the wireless device is in a Radio Resource Connection (RRC) Inactive state, wherein said initiating the RNAU comprises sending a request to resume an RRC connection, and wherein the message comprises an RRC Resume Reject message or an RRC Release message.

3. The method of claim 1, where the method further comprises, responsive to the message, setting, by the wireless device, a periodic RNAU timer to the wait time value, and wherein the method comprises performing, by the wireless device, the RNAU upon expiry of the reject wait timer and the periodic RNAU timer.

4. The method of claim 3, wherein said setting the periodic RNAU timer to the wait time value is responsive to an indication in the message that the periodic RNAU timer is to be set to the wait time value.

5. The method of claim 1, wherein the method further comprises tracking, by the wireless device, the RNAU as a pending notification while the reject wait timer is running.

6. The method of claim 1, the method further comprising:
storing, by the wireless device, information about the message, the stored information comprising one or more of any of the following:
an incremented counter value indicating a number of received rejection messages;
information indicating a location of the wireless device when receiving the message.

7. The method of claim 6, wherein the information indicating the location comprises one or more of any of the following:
a physical cell identifier;
a cell identifier;
a global cell identifier; and
a public mobile land network (PLMN) identifier.

8. The method of claim 6, further comprising subsequently reporting, by the wireless device, the stored information to the wireless network upon entering a connected state.

9. The method of claim 1, the method further comprising:
determining, by the wireless device, that a predetermined number of RNAU attempts have been followed by a network reject; and
upon the wireless device being allowed to access the network again, performing, by the wireless device, a network access stratum (NAS) recovery.

10. The method of claim 1, the method further comprising:
determining that a predetermined number of RNAU attempts have been followed by a network reject; and
upon being allowed to access the network again, performing an inter-frequency cell reselection or inter-RAT cell reselection and attempt a periodic RNAU.

11. A system comprising:
a base station; and
a wireless device comprising transceiver circuitry and processing circuitry operatively associated with the transceiver circuitry, the processing circuitry being configured to perform the method of claim 1.

12. A method, in a wireless network comprising a wireless device and a base station, the method comprising:
initiating, by the wireless device, a combined radio network area update (RNAU) and tracking area update (TAU), responsive to detecting that the wireless device has entered a cell not belonging to a radio network area (RNA) configured for the wireless device and not belonging to a tracking area configured for the wireless device;
transmitting, by the base station, a message indicating that the wireless device's attempt to perform the combined RNAU and TAU has been rejected, the message comprising or being accompanied by an indication that a wait time value is applicable;
receiving, by the wireless device, the message;
responsive to the message, by the wireless device, setting a reject wait timer to the wait time value;
subsequently performing a cell reselection, by the wireless device, prior to expiry of the reject wait timer; and
immediately performing the TAU, by the wireless device, subsequent to the cell reselection.

13. The method of claim 12, further comprising restarting, by the wireless device, a periodic RNAU timer, responsive to the message, and wherein the cell reselection is prior to expiry of the periodic RNAU timer.

14. A system comprising:
a base station; and
a wireless device comprising transceiver circuitry and processing circuitry operatively associated with the transceiver circuitry, the processing circuitry being configured to perform the method of claim 12.

15. A method, in a wireless network comprising a wireless device and a base station, the method comprising:
initiating, by the wireless device, a radio network area update (RNAU) responsive to detecting that the wireless device has entered a cell not belonging to a radio network area (RNA) configured for the wireless device;
transmitting, by the base station, a message indicating that the wireless device's attempt to perform the RNAU has been rejected, the message comprising or being accompanied by an indication that a wait time value is applicable;
receiving the message, by the wireless device; and
responsive to the message, by the wireless device, setting a reject wait timer to the wait time value and notifying the wireless device's RRC layer of the rejection.

16. The method of claim 15, wherein the method further comprises, responsive to the message, by the wireless device, setting a periodic RNAU timer to a default value.

17. A system comprising:
a base station; and
a wireless device comprising transceiver circuitry and processing circuitry operatively associated with the transceiver circuitry, the processing circuitry being configured to perform the method of claim 15.

18. A method, in a wireless network comprising a wireless device and a base station, the method comprising:
initiating, by the wireless device, a radio network area update (RNAU) responsive to detecting that the wireless device has entered a cell not belonging to a radio network area (RNA) configured for the wireless device;
transmitting, by the base station, a message indicating that the wireless device's attempt to perform the RNAU has been rejected, the message comprising or being accompanied by an indication that a wait time value is applicable;
receiving the message, by the wireless device; and
responsive to the message, by the wireless device, tracking the rejected RNAU as a pending notification, such that the rejected RNAU is attempted again as soon as allowed and/or as soon as certain conditions are met.

19. The method of claim 18, further comprising attempting, by the wireless device, the rejected RNAU again, responsive to a reject wait timer expiring.

20. The method of claim 19, wherein said attempting the rejected RNAU is further responsive to determining, by the wireless device, that the wireless device is still camping on a cell outside the RNA configured for the wireless device, when the reject wait timer expires.

21. The method of claim 19, wherein said attempting the rejected RNAU is further responsive to determining, by the wireless device, that the rejected RNAU is a combined RNAU and tracking area update, TAU.

22. The method of claim 19, further comprising attempting, by the wireless device, the rejected RNAU again, responsive to a cell reselection.

23. The method of claim 22, wherein said attempting the rejected RNAU again is further responsive to determining, by the wireless device, that the cell reselection is to a cell that is not in the RNAU configured for the wireless device.

24. The method of claim 22, wherein said attempting the rejected RNAU is further responsive to determining, by the wireless device, that the rejected RNAU is a combined RNAU and tracking area update (TAU).

25. The method of claim 21, wherein the wireless device is in a Radio Resource Connection (RRC) Inactive state, wherein said initiating the RNAU comprises sending, by the wireless device, a request to resume an RRC connection, and wherein the message comprises an RRC Resume Reject message or an RRC Release message.

26. A wireless device comprising transceiver circuitry and processing circuitry operatively associated with the transceiver circuitry, the processing circuitry being configured to perform the method of claim 18.

* * * * *

UNITED STATES PATENT AND TRADEMARK OFFICE
CERTIFICATE OF CORRECTION

PATENT NO. : 11,792,635 B2  
APPLICATION NO. : 17/232329  
DATED : October 17, 2023  
INVENTOR(S) : Mildh et al.

Page 1 of 3

It is certified that error appears in the above-identified patent and that said Letters Patent is hereby corrected as shown below:

On the Title Page

On Page 2, item (56), under "OTHER PUBLICATIONS", in Column 2, Line 7, delete "publishd" and insert -- published --, therefor.

On Page 2, item (56), under "OTHER PUBLICATIONS", in Column 2, Line 20, delete "TAU/RNAin" and insert -- TAU/RNA in --, therefor.

On Page 2, item (56), under "OTHER PUBLICATIONS", in Column 2, Line 22, delete "China,," and insert -- China, --, therefor.

On Page 2, item (56), under "OTHER PUBLICATIONS", in Column 2, Line 29, delete "Author ," and insert -- Author, --, therefor.

On Page 2, item (56), under "OTHER PUBLICATIONS", in Column 2, Line 32, delete "Author ," and insert -- Author, --, therefor.

On Page 2, item (56), under "OTHER PUBLICATIONS", in Column 2, Line 34, delete "#101bis" and insert -- #101 bis --, therefor.

In the Drawings

Figure 5A:
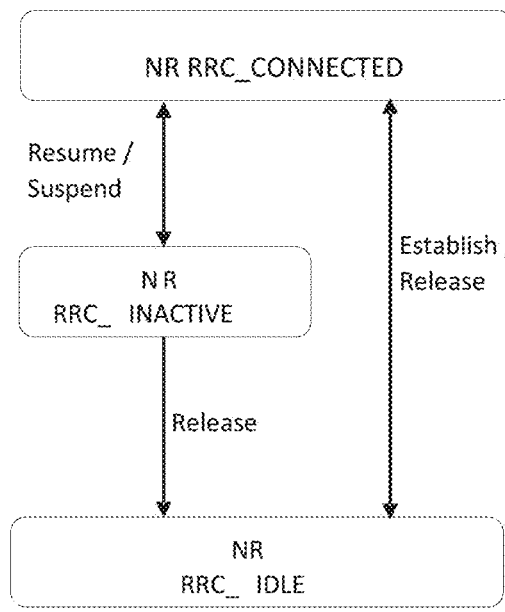
FIGS. 5A and 5B show an exemplary state transition diagram and exemplary flow diagram, respectively, showing possible transitions between RRC states in NR.
Figure 5B:
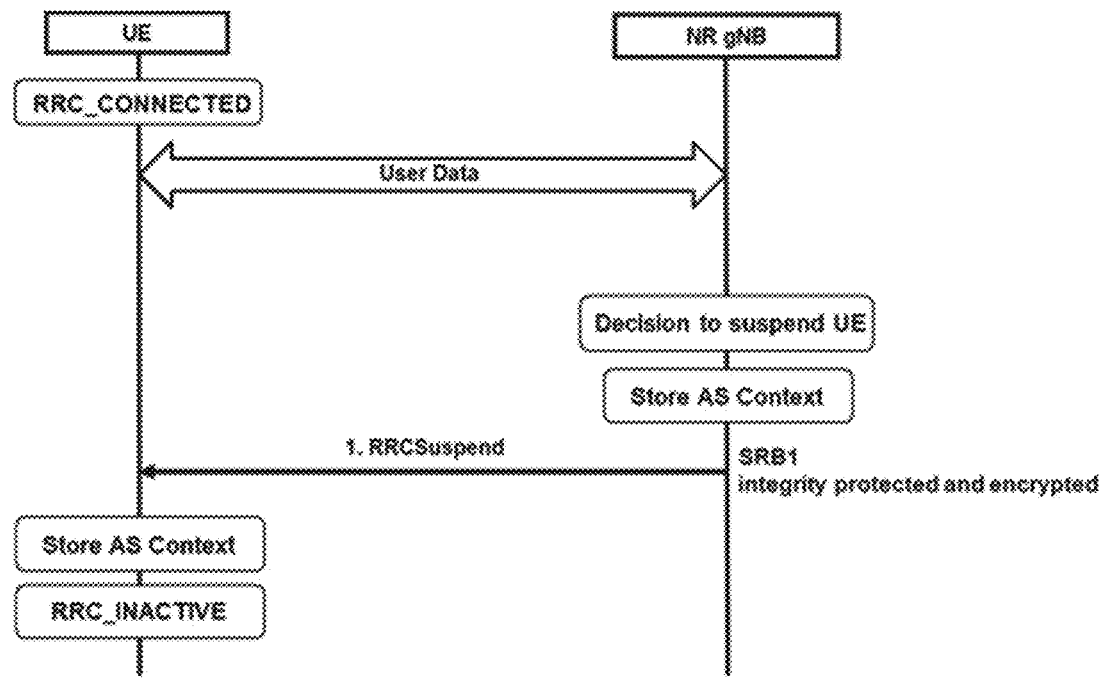
Figure 6A:
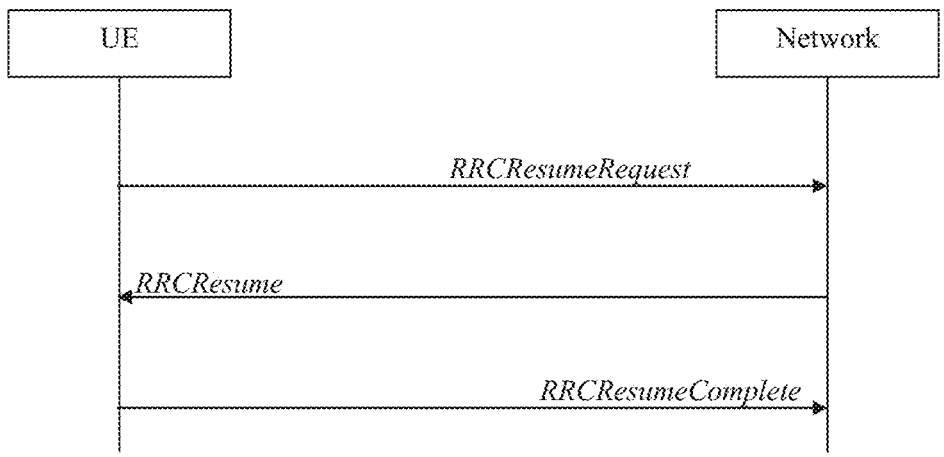
FIGS. 6A, 6B, 6C, 6D, and 6E show exemplary flow diagrams of RRC connection resume procedures involving the UE sending a RRCResumeRequest message to the network, with various network responses, according to various exemplary embodiments of the present disclosure.
Figure 6B:
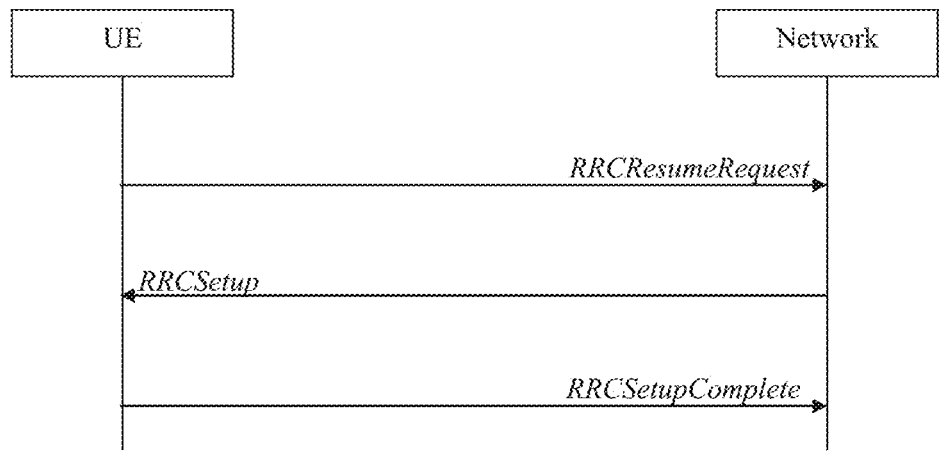
Figure 6C:
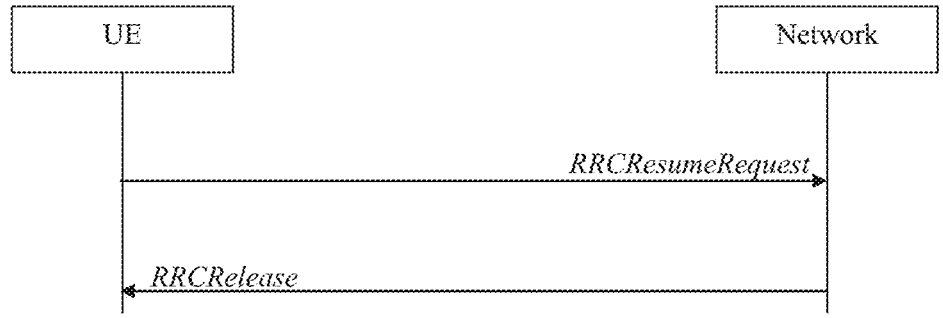
Figure 6D:
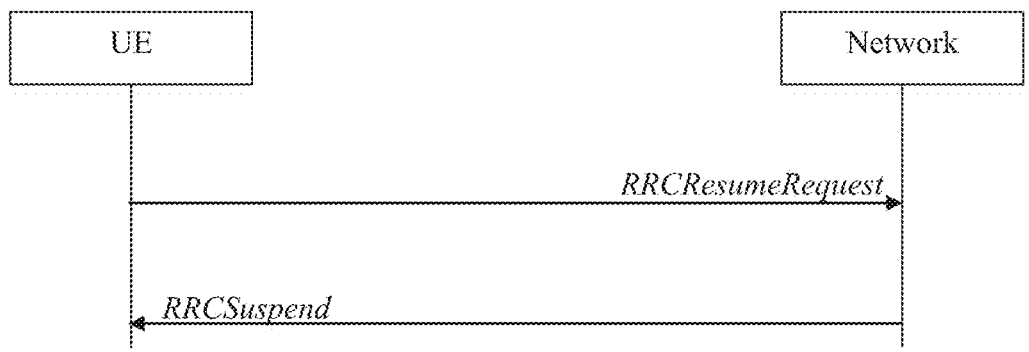
Figure 6E:
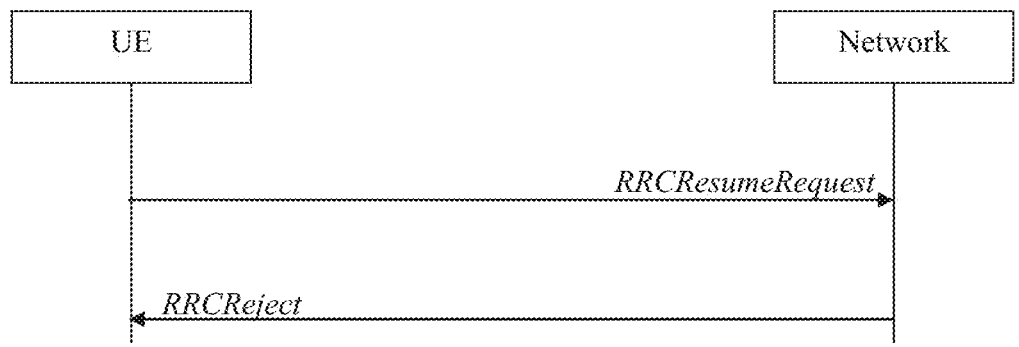

In Fig. 5A, Sheet 6 of 21, delete "  " and insert

Signed and Sealed this  
Seventeenth Day of September, 2024

Katherine Kelly Vidal  
*Director of the United States Patent and Trademark Office*

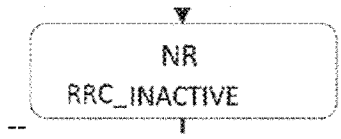 --, therefor.

In Fig. 5A, Sheet 6 of 21, delete "RRC_ IDLE" and insert -- RRC_IDLE --, therefor.

In Fig. 11, Sheet 13 of 21, delete " 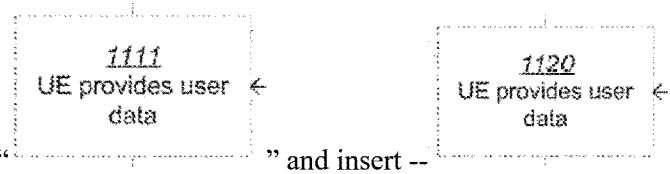 --, therefor.

In the Specification

In Column 1, Line 22, delete "requirement on" and insert -- requirement of --, therefor.

In Column 1, Line 43, delete "Node B's" and insert -- Node Bs --, therefor.

In Column 1, Line 50, delete "third- ("3G")" and insert -- third-generation ("3G") --, therefor.

In Column 2, Line 4, delete "Procotol" and insert -- Protocol --, therefor.

In Column 2, Line 19, delete "is carries" and insert -- carries --, therefor.

In Column 4, Line 29, delete "gNodeB's" and insert -- gNode Bs --, therefor.

In Column 4, Line 45, delete "interchangeability.)" and insert -- interchangeably). --, therefor.

In Column 4, Line 65, delete "that by" and insert -- by --, therefor.

In Column 5, Line 21, delete "form" and insert -- from --, therefor.

In Column 6, Line 14, delete "context." and insert -- context; --, therefor.

In Column 6, Line 15, delete "UE." and insert -- UE; --, therefor.

In Column 7, Line 62, delete "'ma-update'" and insert -- 'rna-update' --, therefor.

In Column 8, Lines 41-42, delete "'ma-update'" and insert -- 'rna-update' --, therefor.

In Column 8, Line 51, delete "equivalent)" and insert -- equivalent). --, therefor.

In Column 8, Line 65, delete "sine" and insert -- since --, therefor.

In Column 10, Line 21, delete "(e.g.," and insert -- e.g., --, therefor.

CERTIFICATE OF CORRECTION (continued)
U.S. Pat. No. 11,792,635 B2

In Column 11, Line 5, delete "FIG. 9-12" and insert -- FIGS. 9-12 --, therefor.

In Column 12, Line 58, delete "which" and insert -- on which --, therefor.

In Column 13, Line 26, delete "circumstances" and insert -- circumstances. --, therefor.

In Column 14, Line 45, delete "prioritize" and insert -- to prioritize --, therefor.

In Column 15, Line 16, delete "notification." and insert -- notification, --, therefor.

In Column 15, Line 41, delete "even" and insert -- event --, therefor.

In Column 16, Line 43, delete "send" and insert -- sent --, therefor.

In Columns 17-18, Line 45, delete "The UE shall:" and insert
-- . . . The UE shall: --, therefor.

In Columns 17-18, Line 53, delete "procedure procedure" and insert -- procedure --, therefor.

In Columns 17-18, Line 55, delete "5.3.13.x T302 expires or is stopped (e.g. upon cell reselection):" and insert -- 5.3.13.x T302 expiry or stop --, therefor.

In Columns 17-18, Line 57, delete "reselection):" and insert -- reselection); --, therefor.

In Columns 19-20, Line 23, delete "KRRCenc key, the KRRCint, the KUPint key and the KUPenc;" and insert -- $K_{RRCenc}$ key, the $K_{RRCint}$, the $K_{UPint}$ key and the $K_{UPenc}$; --, therefor.

In Columns 19-20, Line 25, delete "procedure procedure" and insert -- procedure --, therefor.

In Column 19, Line 33, delete "an gNB-RAN," and insert -- a gNB-RAN, --, therefor.

In Column 21, Line 64, delete "use equipment" and insert -- user equipment --, therefor.

In Column 21, Line 67, delete "which it" and insert -- which --, therefor.

In Column 22, Line 43, delete "etc.; the" and insert -- etc. The --, therefor.

In Column 26, Line 37, delete "includes entering" and insert -- includes --, therefor.

In Column 32, Line 62, delete "met" and insert -- met. --, therefor.

In the Claims

In Column 41, Line 22, in Claim 7, delete "public mobile land network (PLMN)" and insert -- public land mobile network (PLMN) --, therefor.